US010599106B2

(12) United States Patent
Zeier

(10) Patent No.: US 10,599,106 B2
(45) Date of Patent: Mar. 24, 2020

(54) "CLOUD CAPABLE" BATTERY DEVICE COMMAND AND CONTROL MANAGEMENT SYSTEM WITH AN ARTIFICIAL INTELLIGENCE MEANS

(71) Applicant: Bruce Eric Zeier, Romoland, CA (US)

(72) Inventor: Bruce Eric Zeier, Romoland, CA (US)

(73) Assignee: Bravo Zulu International Ltd., Las Vegas, NV (US)

( * ) Notice: Subject to any disclaimer, the term of this patent is extended or adjusted under 35 U.S.C. 154(b) by 529 days.

(21) Appl. No.: 15/076,929

(22) Filed: Mar. 22, 2016

(65) Prior Publication Data

US 2016/0282819 A1    Sep. 29, 2016

Related U.S. Application Data

(60) Provisional application No. 62/136,664, filed on Mar. 23, 2015.

(51) Int. Cl.
*G05B 13/02*    (2006.01)

(52) U.S. Cl.
CPC ................... *G05B 13/028* (2013.01)

(58) Field of Classification Search
CPC .................................................. G05B 13/028
USPC ....................................................... 700/275
See application file for complete search history.

(56) References Cited

U.S. PATENT DOCUMENTS

| | | |
|---|---|---|
| 4,079,443 A | 3/1978 | Udvardi-Lakos et al. |
| 5,648,714 A | 7/1997 | Eryou et al. |
| 5,677,612 A | 10/1997 | Campagnuolo et al. |
| 5,891,590 A | 4/1999 | King |
| 6,184,650 B1 | 2/2001 | Gelbman |
| 6,414,465 B1 | 7/2002 | Banks et al. |
| 6,556,019 B2 | 4/2003 | Bertness |
| 6,586,850 B1 | 7/2003 | Powers |
| 6,586,913 B2 | 7/2003 | Rolfes |
| 6,822,425 B2 | 11/2004 | Krieger et al. |
| 6,975,071 B2 | 12/2005 | Tsai |
| 7,145,266 B2 | 12/2006 | Lynch et al. |
| 2008/0143299 A1 | 6/2008 | Altman |
| 2008/0169819 A1 | 7/2008 | Ishii |
| 2008/0185996 A1 | 8/2008 | Krieger et al. |
| 2008/0247199 A1 | 10/2008 | Djenguerian et al. |
| 2008/0289602 A1 | 11/2008 | Haug et al. |
| 2010/0127666 A1 | 5/2010 | Ball |
| 2011/0106280 A1* | 5/2011 | Zeier ................... H01M 10/42 700/90 |
| 2011/0248835 A1 | 10/2011 | Speegle et al. |

(Continued)

*Primary Examiner* — Robert A Cassity
(74) *Attorney, Agent, or Firm* — Kirk A. Buhler; Buhler & Associates Patenting

(57) ABSTRACT

A Cloud Based System of remotely controlling service and diagnostic devices using a computer based hardware system, computer software, an Artificial Intelligence means comprising computer software and algorithms, a data storage means, a Global Geo-Positioned Local Device management means, and a communications network. While the exemplary device was initially designed as a "Cloud Capable" Battery Device Command and Control Service Oriented System, it is understood that the disclosed Cloud Capable Battery Device Management System is not limited to the Battery Device Service Industry; rather, it may be uniquely suited to other non-battery industry Device Command and Control applications.

16 Claims, 23 Drawing Sheets

(56) References Cited

U.S. PATENT DOCUMENTS

Figure 1:
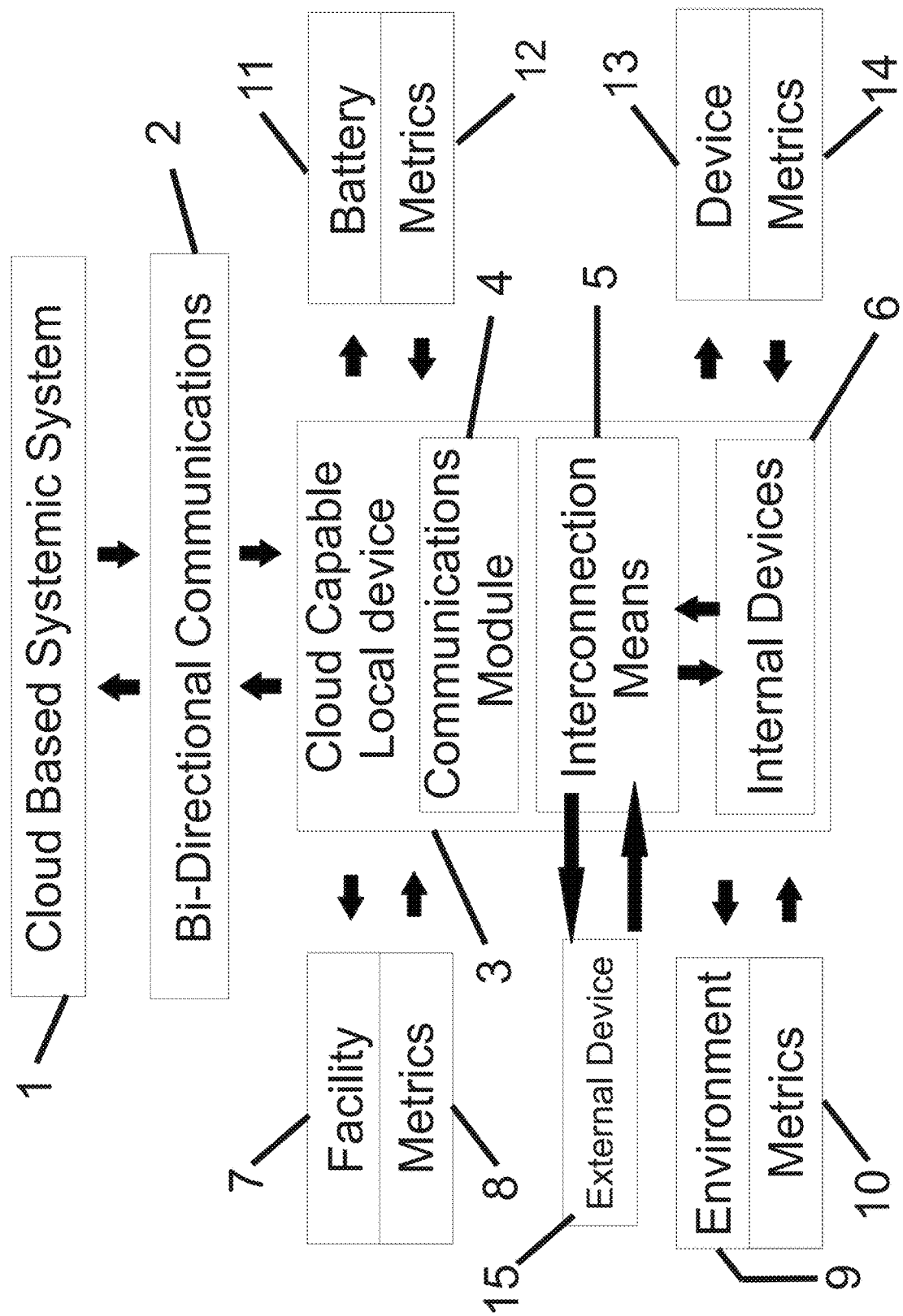

2014/0089692 A1\* 3/2014 Hanafusa .............. H01M 10/48
713/310
2016/0077159 A1\* 3/2016 Petrucelli ............. G01R 31/362
324/426

\* cited by examiner

95 — Human Language and Voice Interface

96 — The Real Time Measurement of Metrics

97 — Compare Historical Metrics to Real Time Metrics

98 — Real Time Scanning of Local Devices

99 — Real Time Modification of Metric Parameters

100 — Real Time Device Control Development and Implementation

101 — Real Time Device Command Development and Implementation

102 — Real Time Data Processing, Storage and Retrieval

103 — Real Time Alarm Parameter Development and Implementation

FIG. 8

FIG. 12

"CLOUD CAPABLE" BATTERY DEVICE COMMAND AND CONTROL MANAGEMENT SYSTEM WITH AN ARTIFICIAL INTELLIGENCE MEANS

CROSS REFERENCE TO RELATED APPLICATION

This application claims the benefit of Provisional Application 62/136,664 filed Mar. 23, 2015, the entire contents of which is hereby expressly incorporated by reference herein.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

Field of the Invention

This invention relates to improvements battery charging. More particularly, the present invention relates to the Industrial Battery Field, or other Commercial of Industrial Fields that may desire a remotely operated management system, capable of Scan, Command and Control of battery(s), facility(s), environmental conditions or other ancillary devices. Specifically, the development of a Cloud Based Battery, or other industrial applied Monitoring, Service, Repair, Diagnostic, or Optimization process that may reduce the associated service labor, technician training costs, or other battery or facility costs. The invention also relates to the development of an Artificial Intelligence Module that may be used within the Battery Industry, or diversified for applications within other industrial fields.

Description of Related Art Including Information Disclosed Under 37 CFR 1.97 and 1.98:

The Industrial Battery Industry uses one or more devices to service, repair or diagnose batteries, which apply a dedicated service, repair or diagnostic process to a battery in a "Conventional" manner. The conventional manner often requires a trained technician to maneuver the battery connection between the individual service/diagnostic devices, or requires the movement of the connected devices to the battery. Those service/diagnostic devices may have internal or external sub-devices, sensors or transducers, which may require a technician to select, calibrate, connect and disconnect when applied to a battery.

The Facilities Industry may use one of more devices to perform functions within the facility, which in a conventional manner are manually controlled by individuals. The invention teaches that those control functions may now be automated and remotely controlled by a centralized location operator, or simply in an automated process.

The "Conventional Methodology—Prior Art" does not consider/teach the reduction or elimination of the temporary transportation of the batteries to a dedicated service facility, or the reduction or elimination of the temporary transportation of the technician and service/diagnostic devices to the battery. In any case, the transportation costs, use of service labor and loss of battery productivity increase the operational cost of the battery.

The "Conventional Methodology—Prior Art" does not consider/teach that an extended interval between scheduled battery applied service processes, may result in lost battery productivity, increased energy consumption during re-charging, and a reduced battery life expectancy.

The "Conventional Methodology—Prior Art" does not consider/teach nor contemplates an Optimization Process using a "Shortened Service Interval" measured in days or weeks, because of the associated labor and transportation cost. Therefore, conventionally maintained batteries or battery cells, may be significantly less cost effective than optimized batteries that incorporate shortened service and diagnostic intervals.

The "Conventional Methodology—Prior Art" does not consider/teach that the service technician's applied service functions, diagnosis, durations, operational parameters, or other functions applied to the battery(s), facility(s) or other ancillary devices; may be subjectively biased, or erroneous, for the particular systems they are working with, or fail to consider environmental conditions relevant to the process.

The "Conventional Methodology—Prior Art" does not consider/teach that the technician may also determine the ultimate serviceability of the battery(s), facility device(s) or other ancillary device(s) using a subjectively biased or erroneous logical means. The technician's subjective serviceability analysis and the lack of empirical data collection, storage, processing and comparison; may limit the ability of the technician to objectively predict future battery longevity, performance and serviceability, or to maximize the serviceability of facility devices.

The "Conventional Methodology—Prior Art" does not consider/teach that the service technician may incur billing and job costing errors, which may impact the economics of the "Conventional Methodology" service or diagnostic process.

The "Conventional Methodology—Prior Art" does not consider/teach that the service or diagnostic quality is limited by the skill, training and objectivity of the individual technician, typically limited to a local service area, which may not be scalable and exportable on a regional or global basis.

The "Conventional Methodology—Prior Art" does not consider/teach the facilitation of a global battery database—battery or facility metric data collection, and comparisons, that may allow the statistical analysis of batteries or facilities by categories providing enhanced battery/facility service, operation or diagnostic knowledge and capability.

The "Conventional Methodology—Prior Art" may not consider that some battery/facility locations previously difficult or impossible to geographically service, may now become "serviceable." Some examples of difficult serviceability access might be batteries located within remote cell towers, or aboard marine vessels at sea. Another example may be the control of a warehouse facility lighting or heating environment.

The "Conventional Methodology—Prior Art" does not consider/teach the remote viewing of the Service, Diagnostic or Functional Device(s), and correspondingly, does not allow the remote viewing of the battery/facility metrics.

The "Conventional Methodology—Prior Art" does not consider/teach the remote viewing of the Service, Diagnostic or Monitoring Device(s), by more than one viewer, or that may be located in different global locations.

The "Conventional Methodology—Prior Art" does not consider/teach the remote servicing or repair of a battery or battery cells.

The "Conventional Methodology—Prior Art" does not consider/teach the local or remotely operated, Automatic Scheduling and the application of battery or facility service, diagnosis or functional repair.

The "Conventional Methodology—Prior Art" does not consider/teach the local or remotely operated, Sequential Device switching means, applying alternating device connections between more than one device and a battery/facility device.

The "Conventional Methodology—Prior Art" does not consider/teach the local or remotely operated, pre-defined "One Click" (of a computer GUI display switching means) repair or optimization capability when using a PC Computer Graphical User Interface (GUI), or a web based communication means.

The "Conventional Methodology—Prior Art" does not consider/teach the local or remotely operated, pre-defined "Automatic Start Mode" to repair or optimize a battery/facility device once the battery/device is simply connected to the Systemic "Cloud Capable Local Device."

The "Conventional Methodology—Prior Art" does not consider/teach the local or remotely operated, pre-defined "Excess Parameter Automatic Stop Mode" during the repair, diagnosis or functional operation, once a monitored device metric has exceeded it's established operational parameter.

The "Conventional Methodology—Prior Art" does not consider/teach that the Cloud Based Controlling Systemic Means may originate Scheduling, Fault or other Instructions or Commands to a technician, or notify a technician via an automated means such as a cell phone text message, an email message, a voice or displayed command on the local or remotely operated device(s), or other communication means.

The "Conventional Methodology—Prior Art" does not consider/teach the capability to remotely position service or diagnostic equipment and remotely limit the use of the said equipment by requiring a periodic subscription or service fee for continued use. A periodic payment may be required to "re-license" the device, or provide a valuable service, which may be billed using a web based shopping cart form of payment, or other payment means. In the event the renewal or service fees are not paid, the Systemic Device(s) may be rendered inoperative until payment is received.

The "Conventional Methodology—Prior Art" does not consider/teach the use of an imbedded GPS or other positioning means, to provide service or diagnostic device location(s), which may be used for positioning on a web based, geographical display system viewed using a communication means connected computer display. The remote viewing of the geographical positioning of the device(s), would allow the remote viewing operator to easily determine the location of a battery or service device, allowing the operator to more easily dispatch service personnel to the scene. When combined with an individual battery, or vehicle/vessel electronic identification system, such as RFID, then the Systemic Device(s) may be able to monitor the position of those individual batteries and vehicles or vessels.

The "Conventional Methodology—Prior Art" does not consider/teach the use of an imbedded GPS or other positioning means, to provide service or diagnostic device location(s), which may be used as an anti-theft deterrent, or a post theft recovery means for the owner of the device.

The "Conventional Methodology—Prior Art" does not consider/teach the remote, Cloud Based, real-time measurement of battery or cell metrics, and the resultant modification of a Service or Diagnostic Device's output to a battery or battery cells.

The "Conventional Methodology—Prior Art" does not consider/teach the Cloud Based measurement and processing of battery or battery cell electrolyte specific gravity data values, then adjusting the output characteristics of the Service or Diagnostic Device(s) to obtain or maintain a targeted specific gravity.

The "Conventional Methodology—Prior Art" does not consider/teach the Cloud Based measurement and processing of battery or battery cell electrolyte temperature data values, then adjusting the output characteristics of the Service or Diagnostic Device(s) to compensate for electrolyte temperature.

The "Conventional Methodology—Prior Art" does not tech the development of "Artificial Intelligence" to further automate the service, diagnostic or functional control of battery or facilities devices.

The "Conventional Methodology—Prior Art" does not teach the Cloud Based Systemic integration and development of a combined battery, facility, environmental or ancillary device management system

BRIEF SUMMARY OF THE INVENTION

The Cloud is a controlling systemic means, device and process which may consist of hardware, a computer processor, computer software, an applied "Artificial Intelligence" means, a data storage means, a Global Geo-Positioned Local Device management means and a bi-directional communication means to locally or remotely, connect with, bi-directly communicate with and monitor, or control, dedicated "Cloud Capable Local Devices."

A "Cloud Capable Local Device," may consist of hardware, a computer processor, computer software, an applied "Artificial Intelligence" means, a data storage means, and a bi-directional communication means to locally connect to, then Scan, Command and Control an object's or facility's Operational Functions, Service Processes, Diagnostic Processes, Repair Processes, Environmental Conditions, and or perform Monitoring Functions, or perform other functions. These devices may work independently, or in conjunction with bi-directionally communicated Scan, Command and Control processes from the Cloud, to monitor the metrics of, or apply processes to, a battery(s), a facility, the environment, or another ancillary device or object.

The "Cloud Capable Local Device(s)," may 1) SCAN or interrogate devices or systems, sensors, or transducer metrics, or 2) may process, develop, store and provide Internal/External Device COMMANDS, and may 3) Scan, Command, Control and Communicate with "Functional, Service and Diagnostic Devices," and may 4) control the application of a "native internal process" by the Internal/External Device(s) connected to the Cloud Capable Local Device upon the battery(s), facilities, environment or other ancillary devices. The "Cloud Capable Local Device" may modify Functional, Service or Diagnostic Internal/External Device parameters that would normally be applied to a battery(s), facility(s), the local device environmental conditions, or other ancillary devices, referred to the modification of the Functional, Service or Diagnostic "Native Parameters," or operating environmental conditions. When the process is used in the Battery Industry, the Cloud Capable Local Device is functionally and electrically positioned between the battery(s), facility(s) and other ancillary device(s) and the controlled Service and Diagnostic Devices. When the process is used in another industry, such as facilities based devices, or transportation based systems such as ships, locomotives, trucking or other mobile systems; the Cloud Capable Local Device is functionally and electrically positioned between the facilities devices, or transportation systems or other mobile systems, and the controlled Service and Diagnostic Devices. The "Cloud Capable Local Device(s)" may bi-directionally communicate audible, visual, or electronically displayed information such as: battery or battery cell metrics (data), bi-directional human voice commands or instructions, Functional, Service and Diagnostic Device metrics, sensor or transducer metrics; geo-reference data or positioning data, or environmental data, using a local or internet based network or internet based computer server. The dedicated computer server, or equivalent storage means, may historically archive any information bi-directionally communicated between the devices, using a Web Based internet connection.

An "Internal/External Device" is any device that would normally be connected individually to a battery, a facility, the environment, or other ancillary device, that provides an operational, standalone function to those devices. An example of an Internal/External Device may be a battery charger that would normally be connected directly to a battery to perform a battery charging process. Another example may be a room air conditioning system to cool a workshop.

The desired Internal/External Devices are physically connected to ports located on or within, the Cloud Capable Local Device. The subsequent connection of the Internal/External Devices to a single point connection, such as a battery, a facility, and environmental transducer or device, or other ancillary devices, is by a conductive means within the Cloud Capable Local Device, typically a transducer, sensor, switch, transistor, or relay. The Internal/External Devices may therefore, be controlled by the Cloud Based Means, or a the Local Cloud Capable Device Means, or the combination thereof; by Manually Operating (sequencing), or "Automatically Sequencing," of the connection between Internal/External Devices and a battery(s), facility(s), environmental devices or other ancillary devices.

The communication means may consist of a wired or wireless means, a local connection such as a wired, WIFI, LAN network, or other local connectivity means; or a remote communication means such as a GSP telemetry and Internet based communication from a fixed IP address, or other data communication means.

Information collected, processed or stored may be displayed using a Computer Graphical User Interface (GUI) and/or a Web Based User Interface, or the equivalent means, that may allow the local or remote Command and Control of the Service or Diagnostic Devices, and the battery(s), battery cell(s), vehicles or vessels, fixed or mobile locations to which the "Cloud Capable System" may be connected.

An "Artificial Intelligence Means" refers to the development of task specific, computer software enabled, conditional algorithmic solutions that may be self-generated, self-learning, knowledge or intelligence based, within the Cloud Based algorithmic process. An example of this process may be when a monitored battery exceeds a recommended metric parameter, triggering an alarm condition, which in turn activates the Artificial Intelligence Module within the Cloud Based Systemic Means.

This Artificial Intelligence Module then collects information formulating an automated response. This response may be derived in whole or in part from a "self-learned" process within the algorithm, which in turn may have been conditioned upon previous event(s), applied event processes, and the result upon the batteries of those applications. Those "self-learned" response process(es) would then be applied to the battery, and a measured result would be compared to the desired algorithmic objective. The Artificial Intelligence module may define Manual or Auto Sequence Mode operational parameters, device metric parameters, alarm parameters; then generate or re-generate, implement or re-implement, activate or de-activate, and save, modify or delete Manual or Auto Sequence Operational Modes. The Artificial Intelligence Mode using either a Manual Operational Mode, or an Auto Sequence Mode of Operation, may determine the sequential order and applied duration of the Internal/External Device(s) connection to the battery, facility, the environment, or ancillary devices.

The Artificial Intelligence Module may self-learn and develop System Parameters and Alarm Triggers based upon measured battery, facility, environmental conditions, or other device metrics, using a computer based software algorithmic process, elements retrieved from a stored database, elements derived from a self-learning process, elements derived from Industry Accepted Techniques and Practices, elements derived from a historical database of like kind situational events, and environmental metrics.

The Artificial Intelligence Module may monitor battery, facility, environmental conditions or other ancillary local devices, compare and formulate Alarm Parameters and triggers, activate an Alarm Condition, formulate and implement a corrective action, test the corrective action, store the event data and reset the Alarm Condition, all without specific human intervention.

Scan refers to the "Scanning or Remote Viewing" capability of the Cloud Based systemic means, device(s) and process(s), to remotely view (monitor) individual battery, facilities, the environmental conditions, or other device or object metrics. Some examples of scanned metrics may be a battery voltage, the outside air temperature, switch positions within a facility, or an analogue sensor on a device. Scanned metrics may be bi-directionally communicated using a wired or wireless means, to a "Cloud Based" systemic means, device, process, or controlling computer software program; or used locally within the Cloud Capable Local Device. The Artificial Intelligence Means may solely manage the Scanning Operational Mode.

A Command refers to the retrieval of stored specific instructions or directions within The Cloud Based Systemic Means, and/or The Cloud Capable Local Device, or the real time development of specific instructions or directions by either the Cloud Based Systemic Means, or Cloud Capable Local Device software algorithms, or the generation and implementation of an Artificial Intelligence means. These Commands may be conditional, utilized when a specific event or situation occurs during the operation and monitoring of the battery, facility, the environment, or other device. Commands may be pre-defined or formulated in real time from software algorithms, to be manually, pre-scheduled or automatically applied, or automatically triggered from a battery, facility, the environment, or other monitored device safety parameter being exceeded, referred to as an "Alarm Condition."

A Command may be stored and retrieved from a data storage means within The Cloud Based Systemic Means, or The Cloud Capable Local Device. Those instructions or directions may result from a Scan of the battery, facility, the environment, or other device metrics, which are compiled, compared and processed by a controlling computer software program, resulting in instructions or directions to the Cloud Capable Local Device(s).

A Command may be developed in real time responding to battery, facility, the environment, or other device(s) monitored metrics. A command may also be imported from a previously determined external means, which may be derived from prior knowledge, industry accepted practices, or a desire to conduct experimentation. The Artificial Intelligence means may solely manage the development of Commands.

Control is the process of applying the Command instructions or directions originating from the Cloud Based Systemic Means, or from the Cloud Capable Local Device means, or the combination or alternation from either means, to the battery, a facility, the environment, or other device(s). The Control of the Cloud Capable Local Device may be from either the Cloud Based Systemic Means, or from instructions stored within the Cloud Capable Local Device itself. The Control of the Cloud Capable Local Device may result from either a Manual Mode of Operation initiated by an operator, or an Auto Sequence Mode of Operation initiated by a computer software program. The Control Process may also consider or compare the resultant effect of the applied process upon the subject battery, facility, environment, or ancillary device, compensating for this affection by the modification of the applied process. The Artificial Intelligence Means may solely manage the Control process.

A human operator using either a Manual Operational Mode, or an Auto Sequence Mode of Operation, may determine the individual or sequential order and applied duration of the Internal/External Device(s) connections to the battery, a facility, the environment, or ancillary device. The order and duration may also be conditionally controlled by a computer algorithm performing real time computations, by an Artificial Intelligence Means, or by automatically applying a previously determined sequence resulting from prior operator scheduling. The devices are then either individually connected during a Manual Mode Operation, or sequentially applied or connected to, the battery(s), the facility(s) or other device(s), during an Auto Sequence Mode of operation.

The Manual Mode of Operation is used when only one process is to be applied, by only one Cloud Capable Local device, to battery(s), facility(s), an environmental condition or other device(s). Exemplary Manual Mode Operations (processes) include, but are not limited to, 1) a Manual Internal Charge Mode, 2) a BattRecon Internal De-sulfation Mode, 3) an Internal Battery Load Discharge Test Mode, 4) a Bank A or Bank B, or "N" Bank Selection Modes, 5) a Both or All Banks Off Mode, 6) an Impedance Test Mode, 7) a Device or All Devices Stop Mode, 8) a Battery or Device Cool Down Mode, 9) an Environmental Temperature or Humidity Control Mode, 10) a Liquid Storage Tank Quantity Measuring Mode, 11) an Electrical Consumption Power Measuring Mode, 12) a Manual Charger By-Pass Mode, 13) a Device or Auto Sequence Pause Mode, 14) a Simulation Playback Mode, 15) a Battery Load Discharge Test By-Pass Mode, 16) a "Call Home Mode" originating from the local devices to the cloud, 17) a "Keep Alive" Mode from The Cloud to poll and update Local Device Status, 18) a Battery Additive Injection Mode, 19) Device Global Positioning and Location Mode, 20) a Local Device Imbedded Internal Auto Sequence Mode and 21) a "Self-Diagnostic and Repair" Mode.

Once the Manual Mode process is selected, the Cloud Capable Local Device computer processor then retrieves device operational and safety parameters from either the Cloud Based, or Local storage database. These selected parameters then limit the process(es) applied to a battery, a facility, the environment, or other ancillary devices, from the application Internal or External Devices. The Cloud Capable Local Device connects and disconnects the individual Internal or External Device to the battery, facility device, environmental device, or other ancillary device, within the operational and safety parameters previously established, for one operational cycle. Once the process is complete, the Cloud Capable Local Device remains idle until another Manual Mode process is selected, from which the Manual Mode Operational Cycle begins again for one individually applied process.

Manual Mode may also have a user defined, local device firmware embedded, Internal Auto Sequence Mode. Internal Auto Sequencing allows the operator to select one pre-defined sequential operation, which performs a combination of more than one firmware embedded Manual Mode operation. Internal Auto Sequencing may prevent against the loss of Cloud Based bi-directional communications and resultant sequence completion failure during a typical Cloud Based Controlled, Auto Sequence Operational Mode. In the event of a communications loss between The Cloud and the Cloud Capable Local Device when operating within Internal Auto Sequence Mode, the firmware embedded Scan, Command and Control Function(s) will continue to sequence Manual Mode Operations, thus completing the Internal Auto Sequence Mode operation. The Artificial Intelligence Means may solely manage the Internal Auto Sequence Mode process.

An example of an exemplary, pre-defined and embedded Internal Auto Sequence Mode, may consist of a fixed sequential application of the Manual Mode Battery Charging Process, followed by a Manual Mode BattRecon de-sulfation process, followed by a Manual Mode Battery Discharging Process. Pressing the Internal Auto Sequence Mode button will cycle the Cloud Capable Local Device to first Charge the battery, then apply the BattRecon de-sulfation process, then discharge test the battery. Optional Manual Mode pre-programmed Internal Auto Sequences may be developed for client specific applications.

The Auto Sequence Mode of Operation is used when more than one Manual Mode Operation is desired to be automatically and sequentially applied to a battery, a facility, the environment or other ancillary devices. The Auto Sequence Mode may be considered as the sequential ordering and connection of individual Manual Mode Internal/External Devices and processes; to the battery, facility, the environment, or other ancillary devices. The operator selects which Manual Mode operated Internal/External Device to apply to the battery, facility, environment, or other ancillary devices, the sequential order and duration of the device connectivity, the individual Internal/External Device parameter(s) for each individual occurrence of those devices, any operational limitations that would be considered as an Alarm Condition worthy of notification to an operator, and the number of rotations that Internal/External Device will be selected within a given Auto Sequence Mode. The Operator developed Auto Sequence Modes may be saved within the Cloud Based Controlling Systemic Means, or the Cloud Capable Local Device, for future recall and use. The Artificial Intelligence Means may solely manage the Auto Sequence process.

The Auto Sequence Mode may Scan, Command and Control more than one Manual Mode Operation for an individual, identical Internal/External device, allowing the changing of individual device parameters within the sequence. As an example, if two differing Load Discharge Manual Mode Operations are sequenced to be applied to a battery from the identical Load Discharge Device, and in one combined Auto Sequence Operational Cycle, then the first Load Discharge Device may be set to terminate the discharge at 1.9 volts per cell, while the subsequent Load Discharge test may be set to terminate the discharge at 1.7 volts per cell.

The Cloud Capable Local Device may be firmware or cloud capable of an Automatic (Auto) Start Feature, which may be used as a means to begin a Manual Mode, or Auto Sequence Operational Mode. When an Auto Start defined event is triggered, then a correspondingly assigned Manual Mode or Auto Sequence Mode process will automatically begin without operator assistance. An example of an exemplary Auto Start event may be the connection of a battery to the Cloud Capable Local Device, which when battery voltage is sensed, triggers the beginning of a Battery Charging Manual or Auto Sequence Operational Mode. The Artificial Intelligence Means may solely manage the Auto Start process.

The Cloud Capable Local Device may be firmware or cloud capable of an Automatic (Auto) Battery Voltage Detection process consisting of software and hardware combined testing of the battery to determine the battery's nominal voltage. Once a battery is connected to the Cloud Capable Local Device, a combined software algorithm and a hardware device apply a brief electrical load, or other diagnostic process(es), to the battery. The results are compared to a database of known battery voltage definitions and a battery voltage determination is made. During applied processes, the Automated Battery Voltage Detection process is operating in the background, continuously ascertaining the battery voltage definition, thus preventing a non-standard deviation battery from being mistakenly characterized. The Artificial Intelligence Means may solely manage the Auto Battery Voltage Detection process.

The Cloud Capable Local Device may be firmware or cloud capable of an Automatic (Auto) Device Metric Detection process consisting of software and hardware combined testing of the monitored metrics. Once a Monitored Metric is connected/detected to the Cloud Capable Local Device, a combined software algorithm and a hardware device, or other diagnostic process(es), may be applied to the metric's originating device. The results are compared to a database of known metrics and metric devices and a determination is made. During any applied processes, the Automated Device Metric Detection process is operating in the background, continuously ascertaining the specific device metric, thus preventing a non-standard deviation device metric from being mistakenly characterized. The Artificial Intelligence Means may solely manage the Auto Battery Voltage Detection process.

The Cloud Capable Local Device may be firmware or cloud capable of an Automatic (Auto) Stop Feature which may be used to terminate the individual Manual Mode Process by the attainment of threshold values of the battery, facility, environment or ancillary device metrics. Such thresholds may include any measured metric, combination of metrics, metric derived algorithm, or time. An example of exemplary Auto Stop thresholds may be, Volts per Cell (VPC) of a battery, or the Time Duration in minutes of the applied function. The Artificial Intelligence Means may solely manage the Auto Stop process.

The Cloud Capable Local Device may be firmware or cloud capable of an Automatic (Auto) Facility, Environmental, or Ancillary Device Detection process consisting of a software and hardware combined testing of the identified, associated devices to determine their connectivity status to the Cloud Capable Local Facility, Environmental, or Ancillary Device. If a connection is determined, then a combined software algorithm and hardware process, pre-defined for that device within the Cloud or Local Device, may apply or modify a process for that device(s). The Artificial Intelligence Means may solely manage the Auto Facility Device Detection process.

The Cloud Capable Local Device may be firmware or cloud capable of an Automatic Event Detection process consisting of combined software and hardware sensing and testing process to monitor applied Internal/External device parameters, or battery, facility, environmental or ancillary device parameters, or monitor a combination and comparison of other/all monitored events, to determine if a Cloud Capable Device response or action would be required. The Cloud or Cloud Capable Device compares the results to a database of known devices or events and their subsequent required reactions. During applied processes, the Automated Device or Event Detection process is operating in the background, continuously ascertaining the device(s) or event(s), implementing or terminating the reactions as necessary. The Artificial Intelligence Means may solely manage the Auto Event Detection process.

The Cloud Capable Local Device may be firmware or cloud capable of an Automatic (Auto) Switching Mode of Operation may also allow the switching between more than one battery, or battery bank, or more than one facility, or more than one operational environment, or more than one other ancillary device, by the use of a multi-channel switching means, enabled within the Cloud Based Systemic Means and physically located in the Cloud Capable Local device. As an example, the Auto Switch Mode the control independent channels, which may then be alternatively connected between and Internal/External Device and battery banks A and B, or "Flip-Flopping" between a heater and an air conditioner when regulating an environment. The Artificial Intelligence Means may solely manage the Auto Switch Mode process.

The Cloud Based System and Cloud Capable Local Device may be firmware or cloud capable of an active Cloud Systemic Polling Mode to "keep alive" the Cloud Capable Local Devices by sending an interrogation command between The Cloud Based Systemic System and the Cloud Capable Local Devices. This interrogation requires a local device to provide status response from the local device. The Polling Mode may be manual or automatically applied, the interval determined by an operator, or the Artificial Intelligence Module.

The Cloud Capable Local Device may be capable of a "Call Home" module, wherein the local device will search for the Cloud Based System Connection based upon a time factor or event conditional statement.

The Cloud Capable Local Device may be firmware or cloud capable of a Remote System "Reboot" or Update process, wherein a new software Cloud Capable Local Devices may be Remotely Repaired, Tested, Re-booted or Updated from the Cloud Based System, by the transmission of the repair, re-boot or update data, or software code, using the Cloud Based bi-directional wired or wireless communication means. For system updates, a new operating system may be sent and stored on the local device memory, then initialized when the system is re-booted.

The Cloud Based Graphical User Interface (GUI) may have a Single Point Global Voltage or Metric Setting and Comparison System, allowing the operator to set the nominal battery voltage, or other measured Metrics, on the Dashboard of the GUI, which may allow the operator to visually confirm the battery's expected voltage, or an attached device's metrics, be compared to the displayed or measured voltage or metric. When using systems without an automatic voltage or metric detection system, the operator has a simple way to compare the device voltage or metric setting(s) to the actual connected battery voltage or device's desired settings. The Artificial Intelligence Means may solely manage the Single-point Global Metric Setting and Comparison process.

The Cloud Based Graphical User Interface (GUI) may have more than one remote viewer and controlling means during one active session. The GUI may have a Simulation Demonstration mode, or a Playback Mode to re-play a previously recorded actual event cycle. Any of the aforementioned features may have an applied use for advanced remote monitoring, sales demonstrations or training purposes A Cloud Based Graphical User Interface (GUI) may employ a Dashboard Refreshment means to update the data display within the dashboard. The GUI may employ an Offline Refreshment means to poll the connection between The Cloud Based System and the Cloud Capable Local Device. The GUI may employ an Alarm Refreshment means to poll the Cloud Capable Local Device for unreported alarm conditions. The Cloud Based System may assign differing Alarm Definitions, Alarm Triggers, and Operational Safety Parameters to differing stations within the Station Selection Operational Database. The Cloud Based System may assign Global Parameters to specific operational stations, which may be used a Parameter Defaults when operating in Manual Mode Operation.

A Charger By-Pass Module and Operational Mode providing a measured and monitored conductive pathway for the connection between an external charger and a battery, through the Cloud Capable Local Device. When activated, a physical and electrical connection is completed within the Local Device to allow the battery a direct connection to the External Charger. The Local Device monitors charge and battery metrics during the activation of the connection. The Artificial Intelligence Means may solely manage the Charger By-Pass Mode process.

An additional Auxiliary Device(s) may be provided a Device By-Pass Module and Operational Mode to provide a measured and monitored conductive pathway for the connection between an Auxiliary External Device and a battery, a facility device, an environmental device, or other ancillary device(s), through the Cloud Capable Local Device. When activated, a physical and electrical connection is completed within the Local Device to allow the Auxiliary Device to be directly connected to the battery, the facility device, the environmental device or other ancillary device. The Local device monitors the Auxiliary Device and battery, facility, environmental device and ancillary devices during the activation of the connection. The Artificial Intelligence Means may solely manage the Auxiliary Device By-Pass Mode process.

A Graphical User Interface (GUI) Geo-Positioning (Reference) Indication and Local Device Status display, allows the operator to visually observe the operating status of dedicated Cloud Capable Local Devices, which are imposed upon a local, regional or a global world map(s) for easy operator identification of Cloud Capable Local Devices. The imposed images may be colored coded to provide a casual "status at a glance" capability, especially important when a centralized operator is monitoring numerous local device stations. Once a local device status changes, so may the color code of the image. In the event the image color code changes, an operator may place a mouse or other pointing device on the graphical image, opening a new display window providing status or alarm indications relevant to that specific device station. The change of a status display may also trigger an alarm condition, which in turn may provide automated notification to an operator(s), such as using an email or text message, or other communication means. The Cloud Based GUI system allows the localized devices to be operated and managed by a Centralized Command and Control Center. The Artificial Intelligence Means may solely manage the GUI Geo-Positioning Indication Mode process.

An example of an exemplary Geo-Reference GUI system might be the changing of a station locator form a Green (Acceptable) status, to a Yellow (Warning Status), or a Red (Failure) status. In the event a local station status changed from a Green Condition to a Red Condition because a cell tower battery was stolen, as an example, then the GUI station display image would change from Green to Red and a communication may be sent to an operator such as text message indicating the change of that station's status.

Device, battery, environmental or facility metrics may be used to establish Safety or Operational Parameters, which are limitations established by the operator to allow the devices, battery or facilities devices to safely operate within. Operational Parameters may be used to provide environmental control for a battery, facility or other device-working environment.

In the event that parameters are exceeded, then an Alarm Trigger and Fault Code associated with those parameters is broadcast by the Cloud Capable Local Device, or The Cloud Based system, to the operator, or the Artificial Intelligence Module for a corrective action.

Once a Fault Code is triggered the operator may take a manual action to reset the Fault Code, or the Fault Code may trigger an automated corrective action stored within the Cloud Based System or Cloud Capable Local Device, or The Artificial Intelligence Module may take a calculated corrective action. An example of an Alarm Condition and notification may be; 1) if the Battery Stolen Parameter requires that battery voltage must be greater than 1 volt, and a zero battery voltage metric is reported, then the "Battery Stolen Alarm" will notify the centralized Cloud Based Systemic Operator, or Artificial Intelligence Module, that the Battery has been stolen.

Custom "Alarm Trigger" conditional statements, definitions and parameters may be created and saved by the Cloud Based Systemic Operator, or Cloud Capable Local Device Operator, based upon battery, facility, environmental or auxiliary device metrics collected, processed, and communicated by the Cloud Capable Local Device, to the Cloud Based Systemic Device and Process.

Local Device Alarm Triggers may be Cloud Based and systemic, or defined by local device operators and applied to local devices only, or defined by operational management, or defined by Industry Accepted Methods and Practices, or defined by the Artificial Intelligence Module.

Batteries, battery cells, vehicles and vessels, or fixed or mobile battery locations may have an integral RFID identification system, or the equivalent identification means, to enable the categorization and storage of information pertaining to that (those) batteries, cells, vehicles and vessels, or facilities devices, in fixed or mobile locations, enabling the further automation of the Scan, Command and Control Process.

"Functional, Service, or Diagnostic Devices" are machines or devices previously intended for the application of individual "standalone" purposes, typically limited to manually operate by local command and control, such as an individual battery charger during the re-charging of a battery (a Service Device), or an individual battery discharging machine performing a battery discharge test (a Diagnostics Device), or a facilities based air compressor, as examples.

The "Cloud Based" controlling system means, device and process may manually or automatically connect one or more Cloud Capable Local Devices, used to monitor, service, diagnose, repair, and functionally operate batteries, facilities devices, environmental devices or ancillary devices, using minimal human labor factors. An "Artificial Intelligence Mode" may "learn" to monitor, service, diagnose, repair, and functionally operate battery devices, facilities devices, environmental devices or ancillary devices absent of human interaction.

This connection may be an individual or sequential connection of an Internal/External Device(s), with a conductive pathway through the Cloud Capable Local device. This conductive path is controlled by the Cloud Based System, or the Cloud Capable Local Device firmware. This process was designed to reduce technician labor, training, facilities expenses and reduce a technician's proclivity for subjective error.

The "Cloud Based System" reduces or eliminates the transportation of batteries to a dedicated service facility, or reduces or eliminates transportation of the technician and service/diagnostic devices to the battery. In any case, the reduced transportation costs, service labor and increased battery productivity reduce the operational cost of the battery.

The Cloud Based System provides centralized, remote Scan, Command and Control process for facilities or environmental subsystems.

The "Cloud Based System" reduces the interval between scheduled battery applied service processes, may result in increased battery productivity, decreased energy consumption during re-charging, and an increase n battery life expectancy.

The "Cloud Based System" Optimization Process uses a "Shortened Service Interval" measured in days or weeks. Optimized batteries on a more frequent basis may be significantly more cost effective than Conventionally Maintained batteries.

The "Cloud Based System" provides the Systemic Control of Service and Diagnostic Devices during the application of service functions, durations, operational parameters, or other service functions applied to a battery, a facility, the environment or other ancillary devices, which may be more objective and accurate for the particular battery/device combination they are working with.

The "Cloud Based System" enables increased accuracy of the battery or facility servicing process, compared to the subjective interpretation by a technician. The "Cloud Based System" analyzes the battery or facility devices using empirical data collection, storage, processing and comparisons; that may improve the battery longevity, performance and serviceability.

The "Cloud Based System" provides more precise service billing and job costing results, compared to the "Conventional Methodology" service process.

The "Cloud Based System" is less dependent upon the skill, training and objectivity of the individual technician.

The "Cloud Based System" facilitates the use of a global battery database—battery metric data collection, and comparisons, that may allow the statistical analysis of batteries and facilities devices by categories and provide advancement in battery/facility service knowledge and capability.

The "Cloud Based System" allows battery or facility locations previously difficult or impossible to geographically service, may now become "serviceable." Some examples of previously difficult, but now serviceable access, might be batteries located within remote cell towers, or aboard marine vessels at sea.

The "Cloud Based System" allows the remote viewing of the Service or Diagnostic Device(s), by one or more viewers, who may be located in different global locations.

The "Cloud Based System" allows the remote viewing of "non-battery metrics" such as Temperature, Humidity or other environmental conditions that may affect a battery or facility operational performance.

The "Cloud Based System" allows the remote viewing of ancillary devices, systems, transducers or sensors, such as the measurement of a fuel reservoir tank using a fuel quantity transmitter, or data from the digitization of specific gravity.

The "Cloud Based System" allows the remote servicing or repair of a battery or battery cells, a facility device, environmental device or ancillary device The "Cloud Based System" allows the remote viewing of the physical area near the Service or Diagnostic Device, using a video or still camera view.

The "Cloud Based System" allows the local or remotely operated devices to automatically schedule and apply battery(s), or battery cell(s) service or diagnostic repair, or facilities device service or diagnostic repair.

The "Cloud Based System" provides a local or remotely operated, Sequential Device switching means, applying alternating device connections between more than one device and a battery(s) or battery cell(s), facility device, environmental device or ancillary device.

The "Cloud Based System" accommodates the local or remotely operated, pre-defined "One Click" (of a computer GUI display switching means) repair or optimization capability when using a PC Computer Graphical User Interface (GUI), or a web based communication means.

The "Cloud Based System" provides a local or remotely operated, pre-defined "Automatic Start Mode" to repair or optimize a battery once the battery is simply connected to the Systemic "Cloud Capable Device."

The "Cloud Based System" provides a local or remotely operated, pre-defined "Excess Parameter Automatic Stop Mode" during the repair or optimization, once a battery or facility monitored device metric has exceeded its established operational parameter.

The "Cloud Based System" may originate and notify an operator of an operational Fault via an automated means, such as a cell phone text message, an email message, a voice or displayed command on the local or remotely operated device(s), or other communication means.

The "Cloud Based System" provides the capability to remotely position service or diagnostic equipment and remotely limit the use of the said equipment by requiring a periodic subscription or service fee for continued use. A periodic payment may be required to "re-license" the device, or provide a valuable service, which may be billed using a web based shopping cart form of payment, or other payment means. In the event the renewal or service fees are not paid, the Systemic Device(s) may be rendered inoperative until payment is received.

The "Cloud Based System" may use an imbedded GPS or other positioning means, to provide service or diagnostic device location(s), which may be used for positioning on a web based, geographical display system viewed using a communication means connected computer display. The remote viewing of the geographical positioning of the device(s), would allow the remote viewing operator to easily determine the location of a battery or facility service device, allowing the operator to more easily dispatch service personnel to the scene. When combined with an individual battery, facility or vehicle/vessel electronic identification system, such as RFID, then the Systemic Device(s) may be able to monitor the position of those individual batteries, facilities devices, and vehicles or vessels.

The "Cloud Based System" may use an imbedded GPS or other positioning means, to provide service or diagnostic device location(s), which may be used as an anti-theft deterrent, or a post theft recovery means for the owner of the device.

The "Cloud Based System" may use the remote, real-time measurement of battery, facility, environmental or ancillary device metrics, and the resultant modification of a Service or Diagnostic Device's applied output.

The "Cloud Based System" may measure and process battery or battery cell electrolyte specific gravity data values, then adjusting the output characteristics of the Service or Diagnostic Device(s) to obtain or maintain a targeted specific gravity.

The "Cloud Based System" may measure and process battery or battery cell electrolyte temperature data values, then adjusting the output characteristics of the Service or Diagnostic Device(s) to compensate for electrolyte temperature.

Various objects, features, aspects, and advantages of the present invention will become more apparent from the following detailed description of preferred embodiments of the invention, along with the accompanying drawings in which like numerals represent like components.

BRIEF DESCRIPTION OF THE SEVERAL VIEWS OF THE DRAWING(S)

Figure 2:
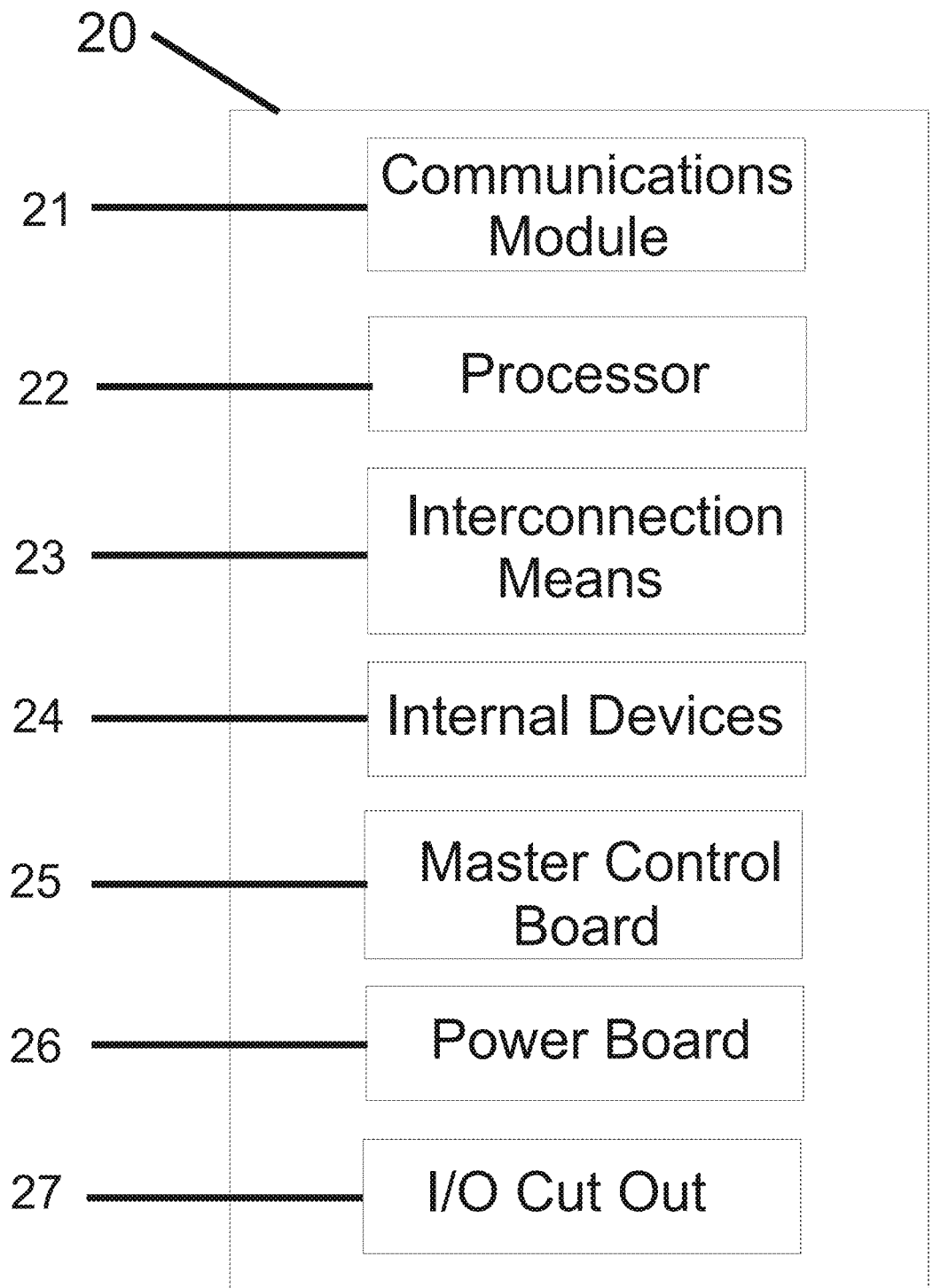
Figure 3:
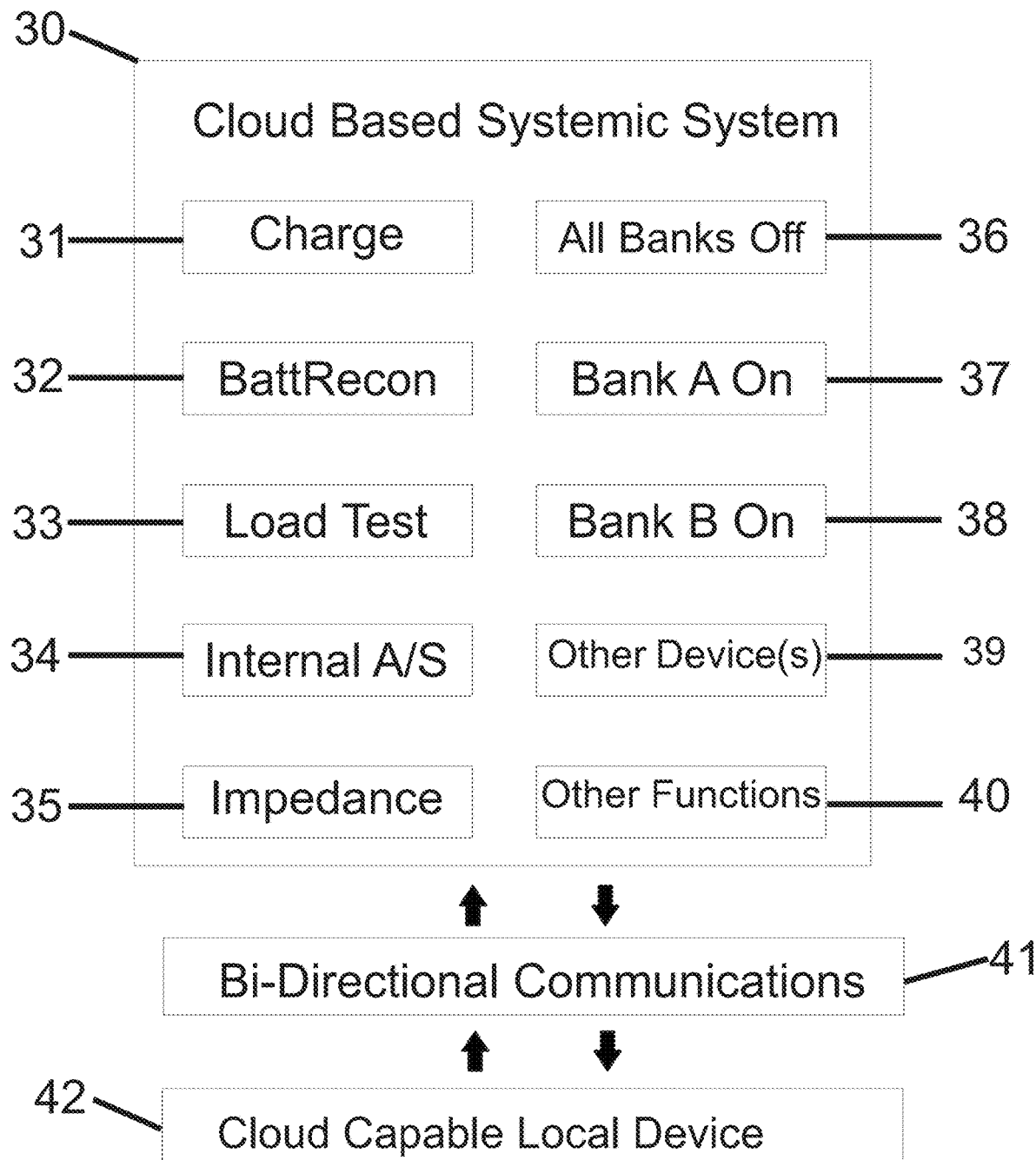
Figure 4:
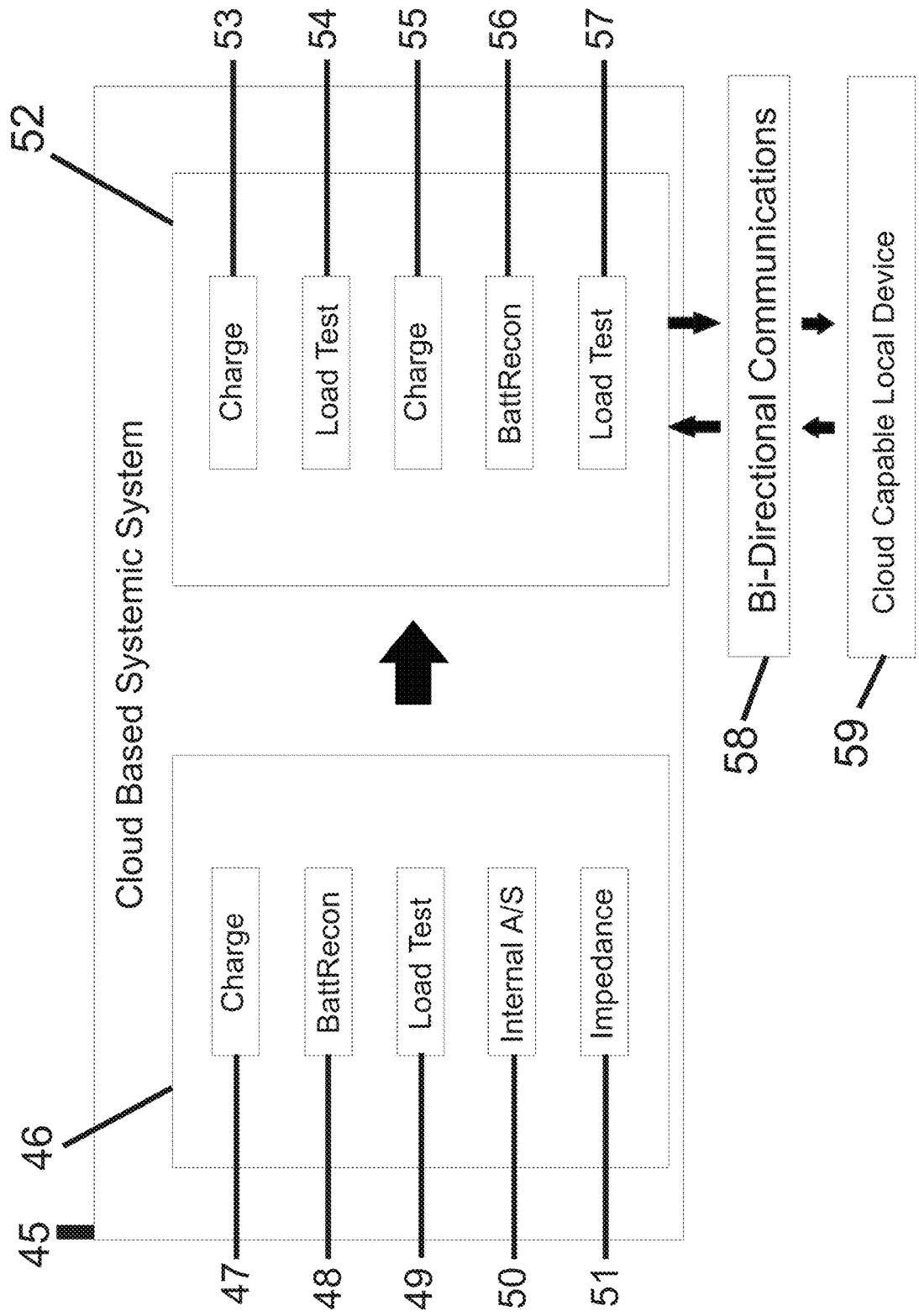
Figure 5:
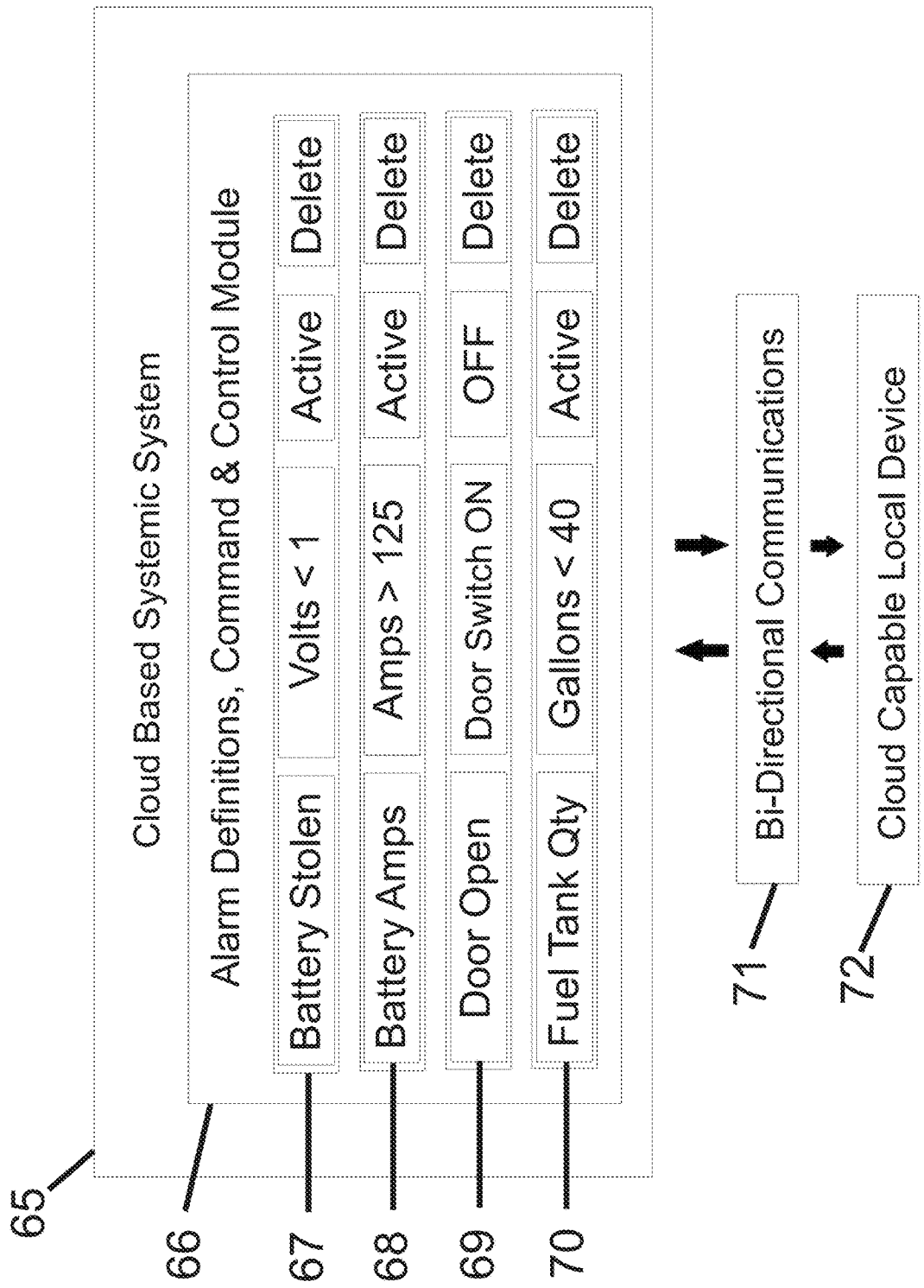
Figure 6:
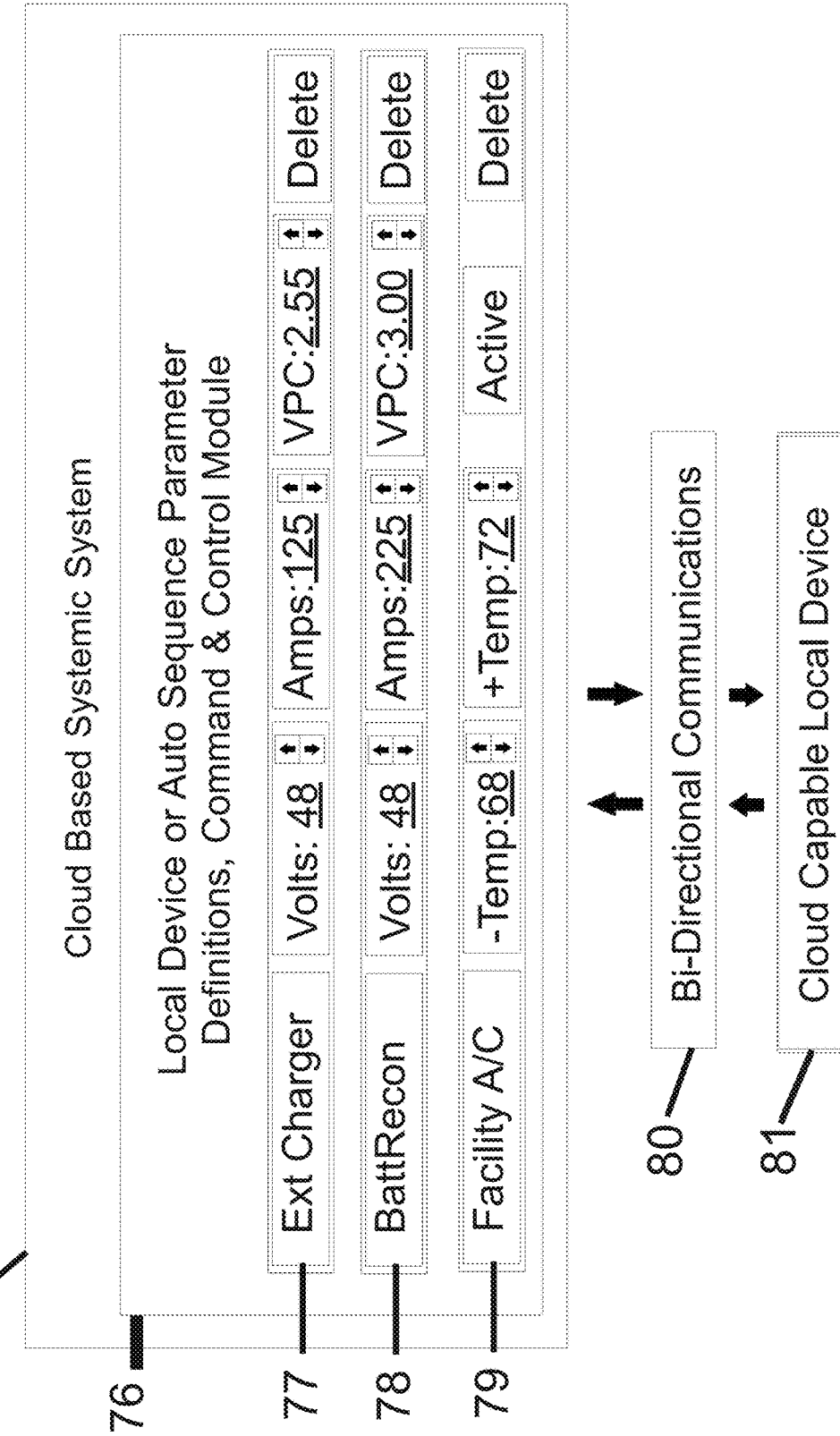
Figure 7:
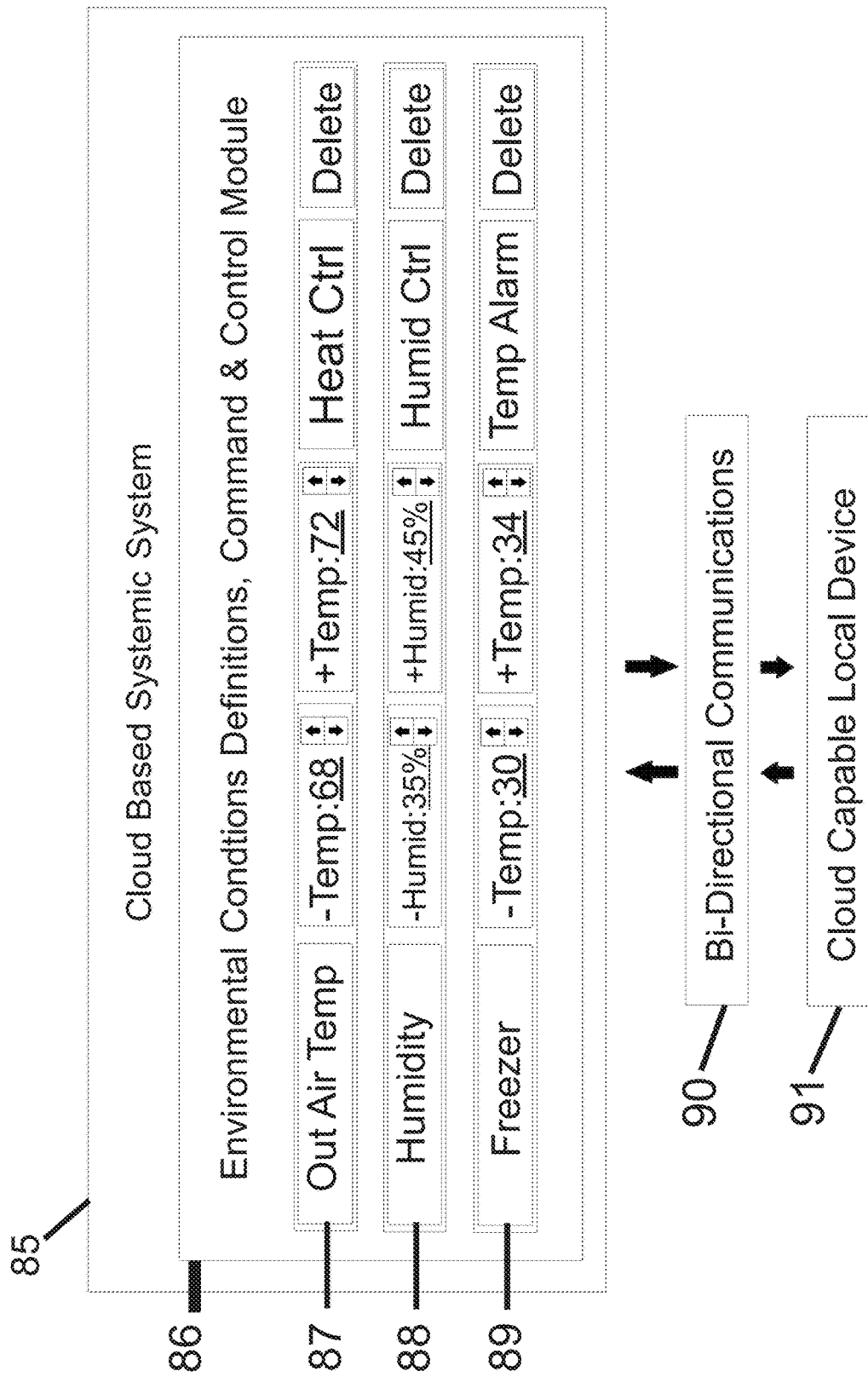
Figure 9:
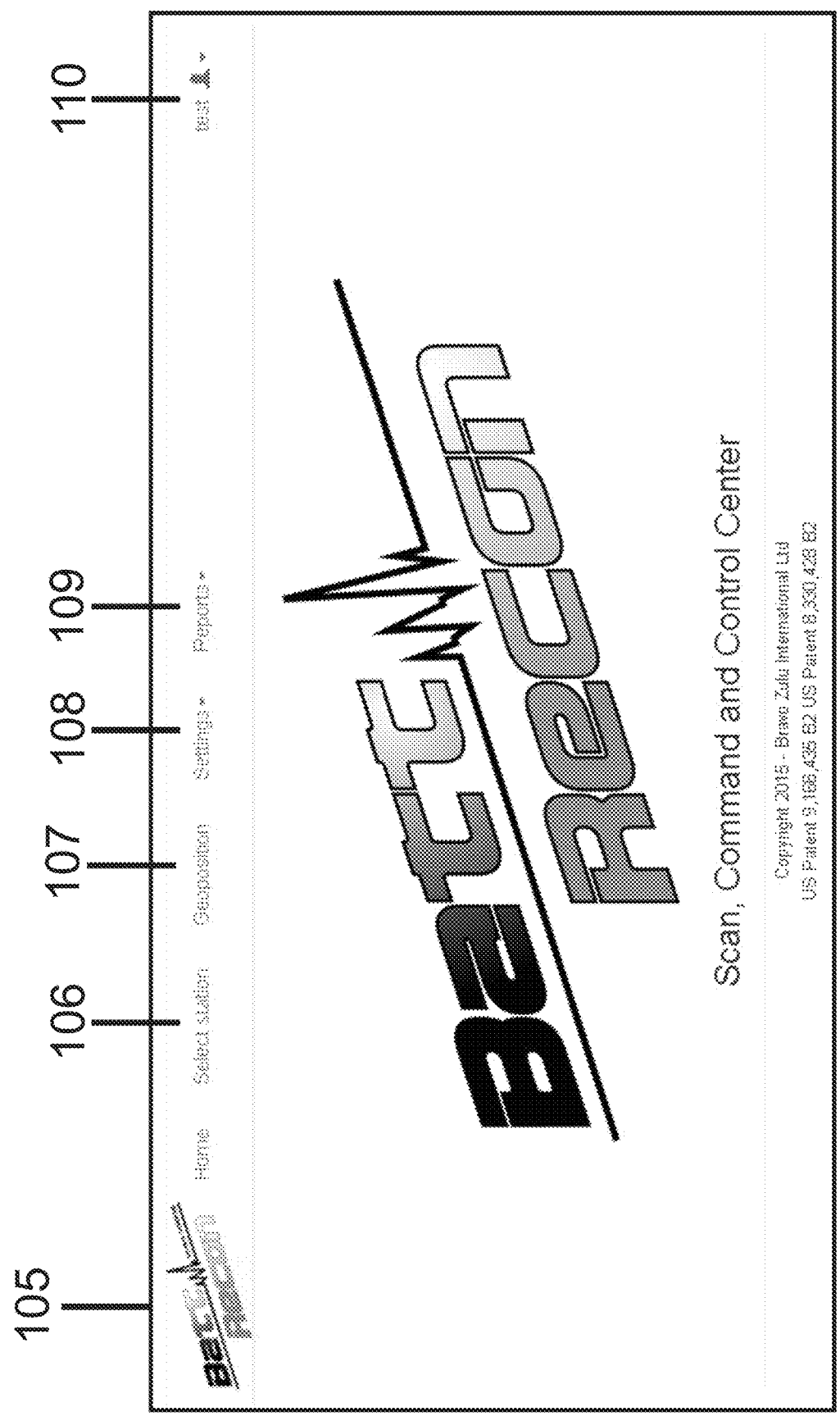
Figure 10:
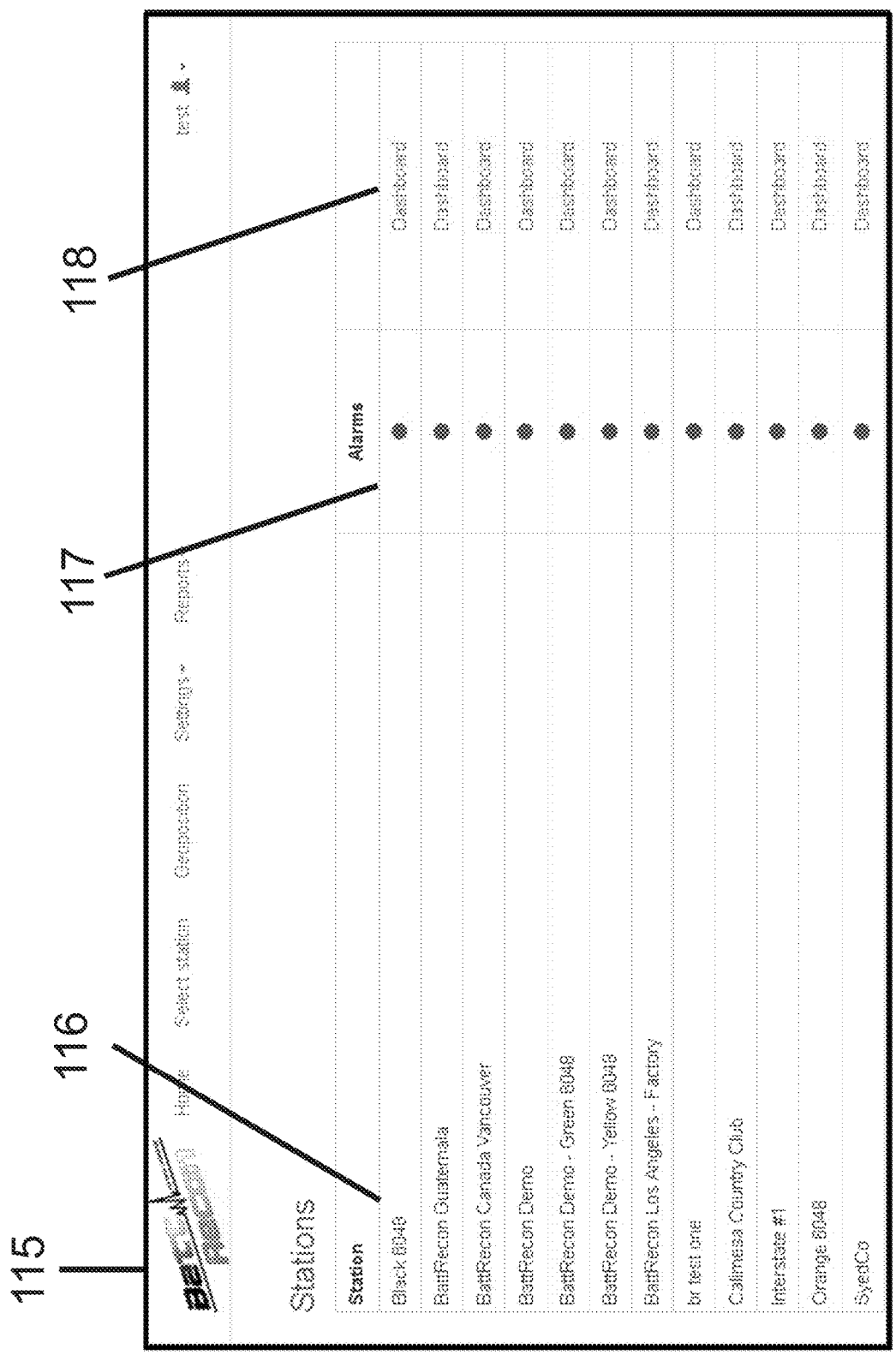
Figure 11:
Figure 13:
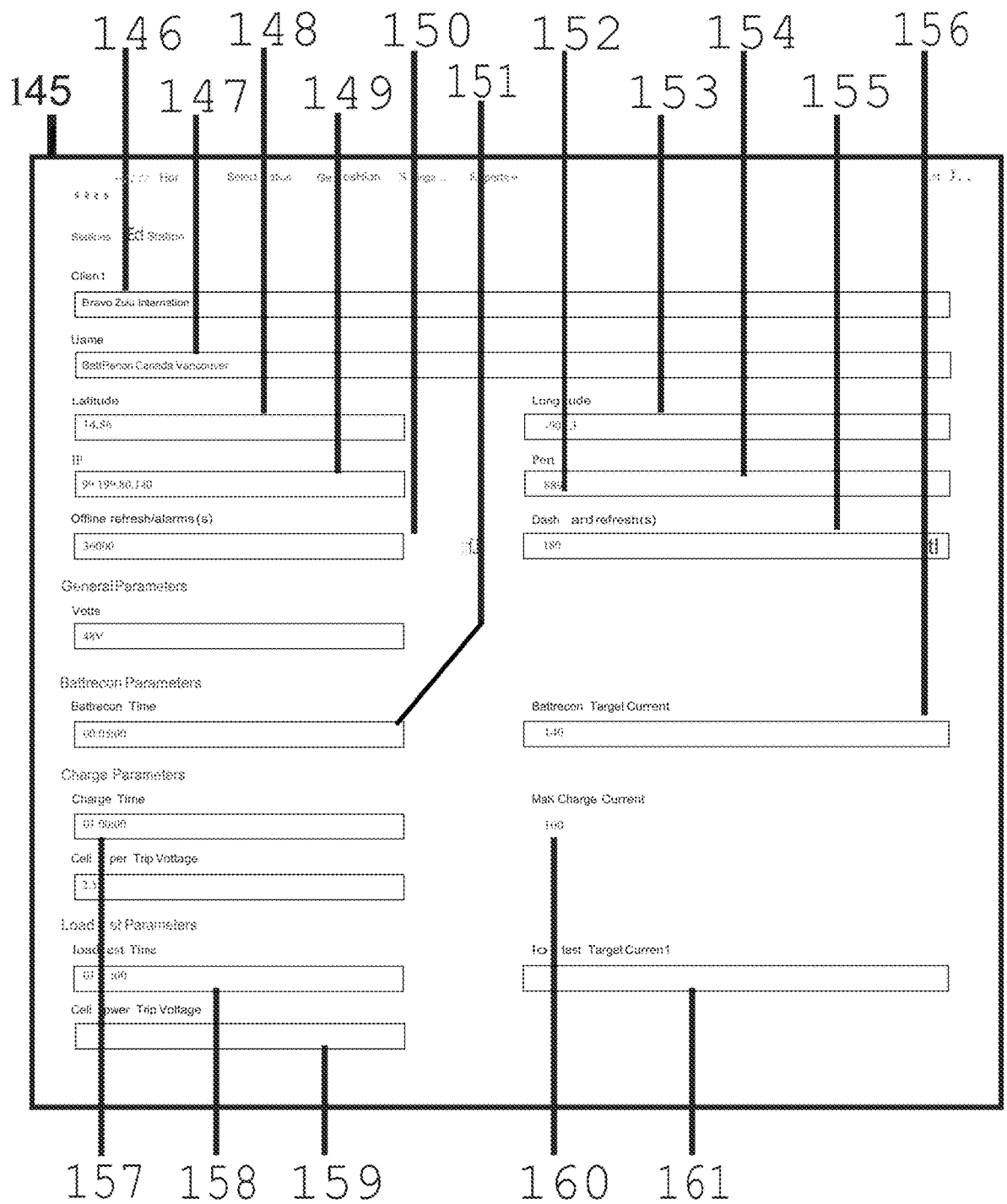
Figure 14:
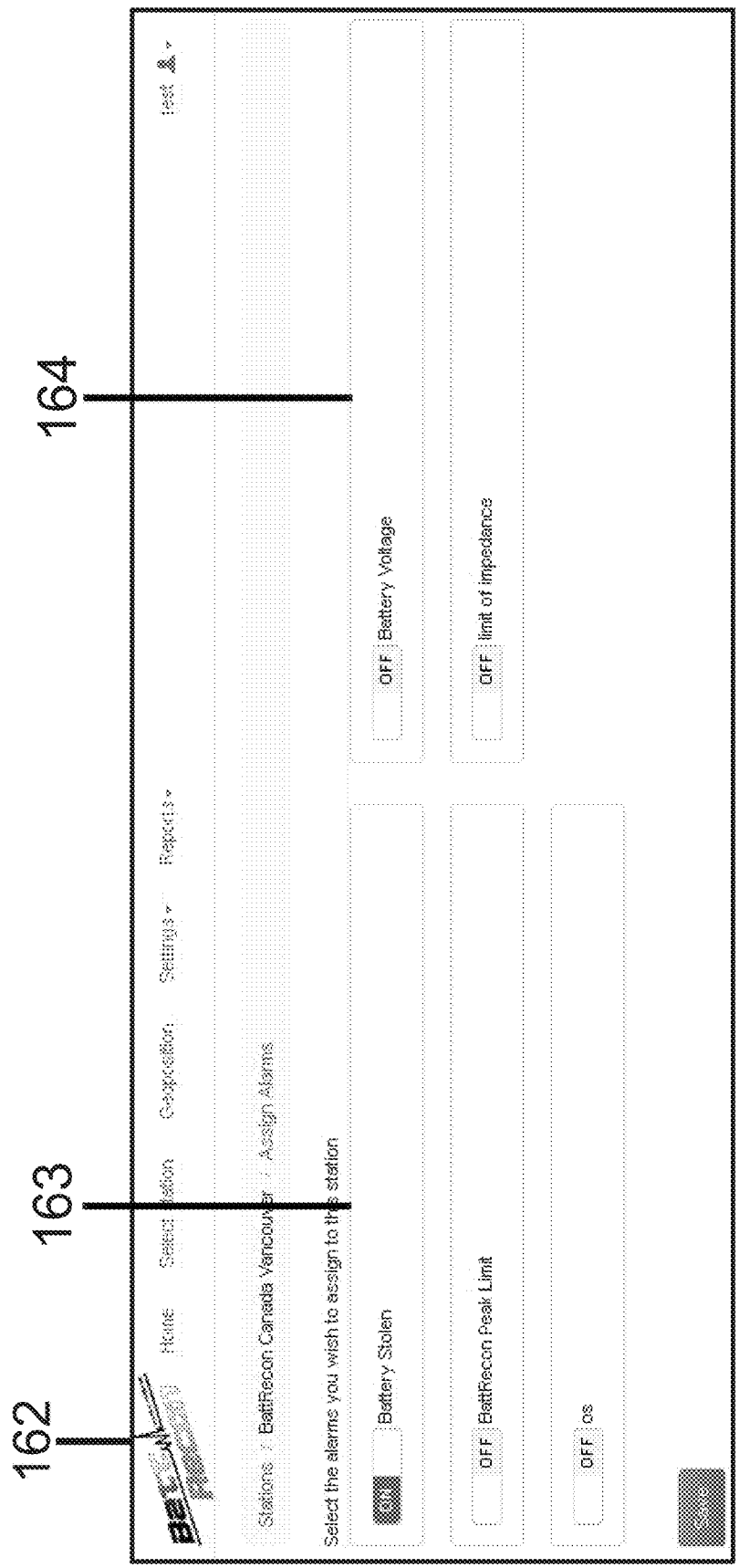
Figure 15:
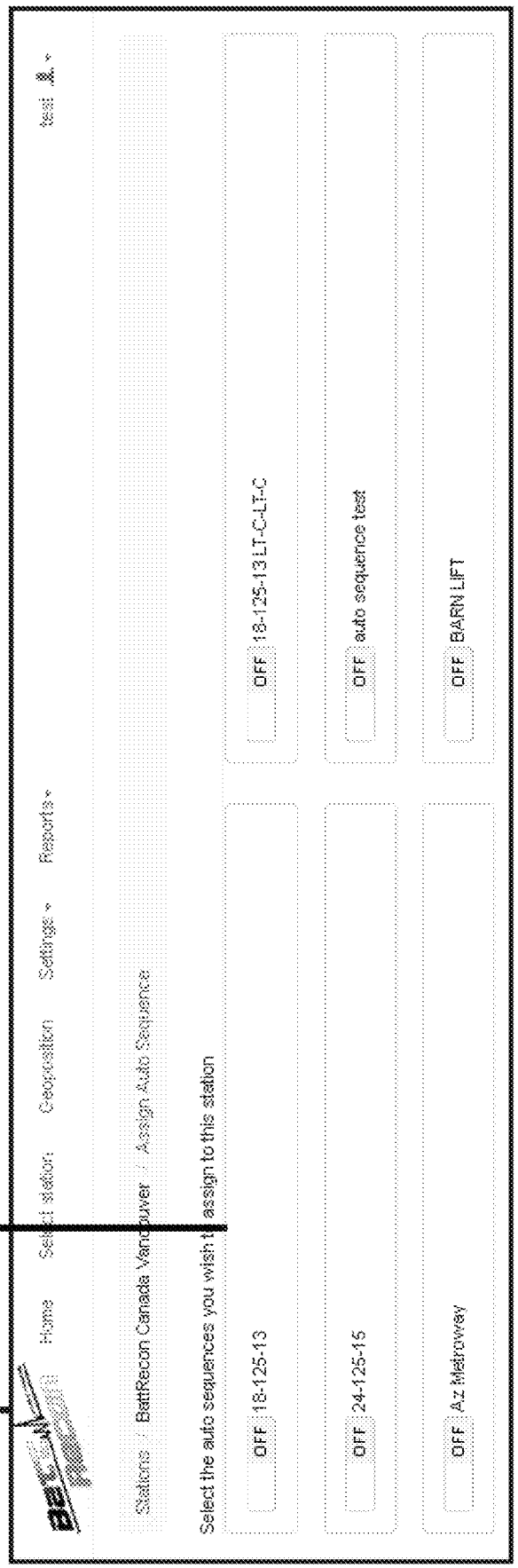
Figure 16:
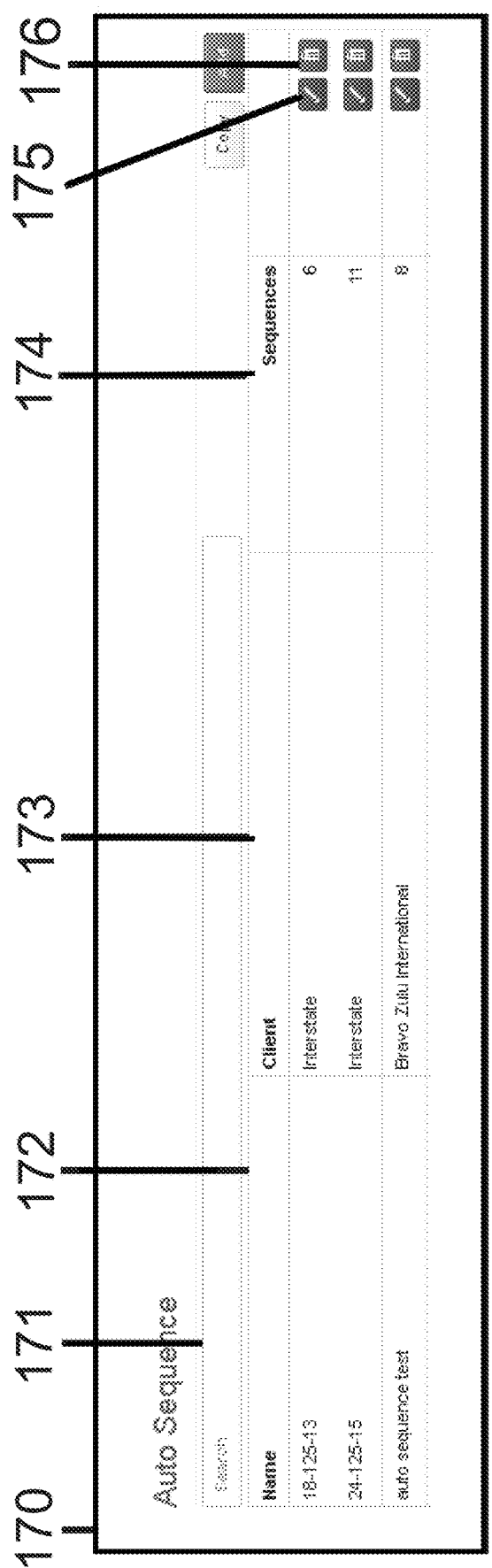
Figure 17:
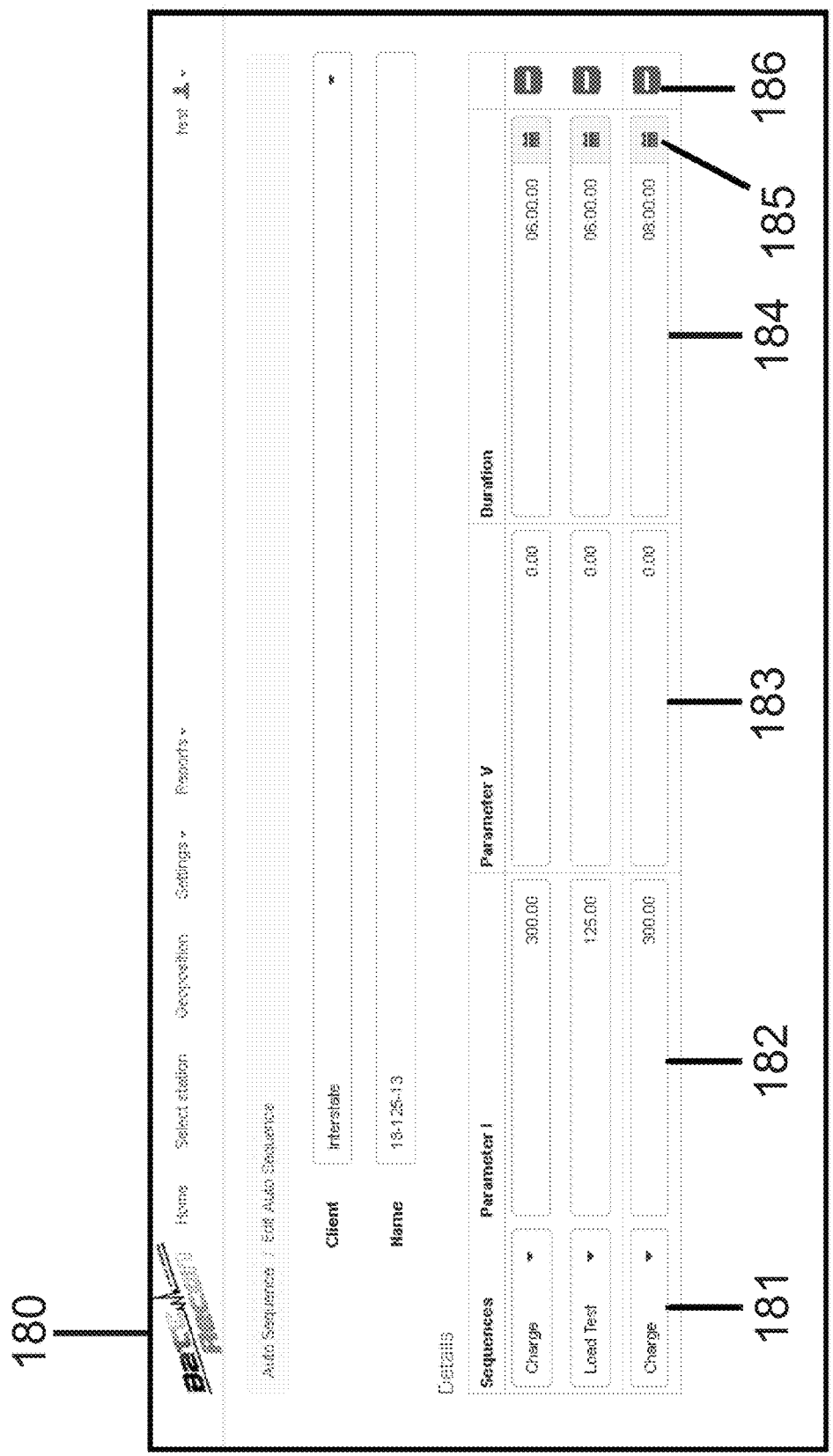
Figure 18:
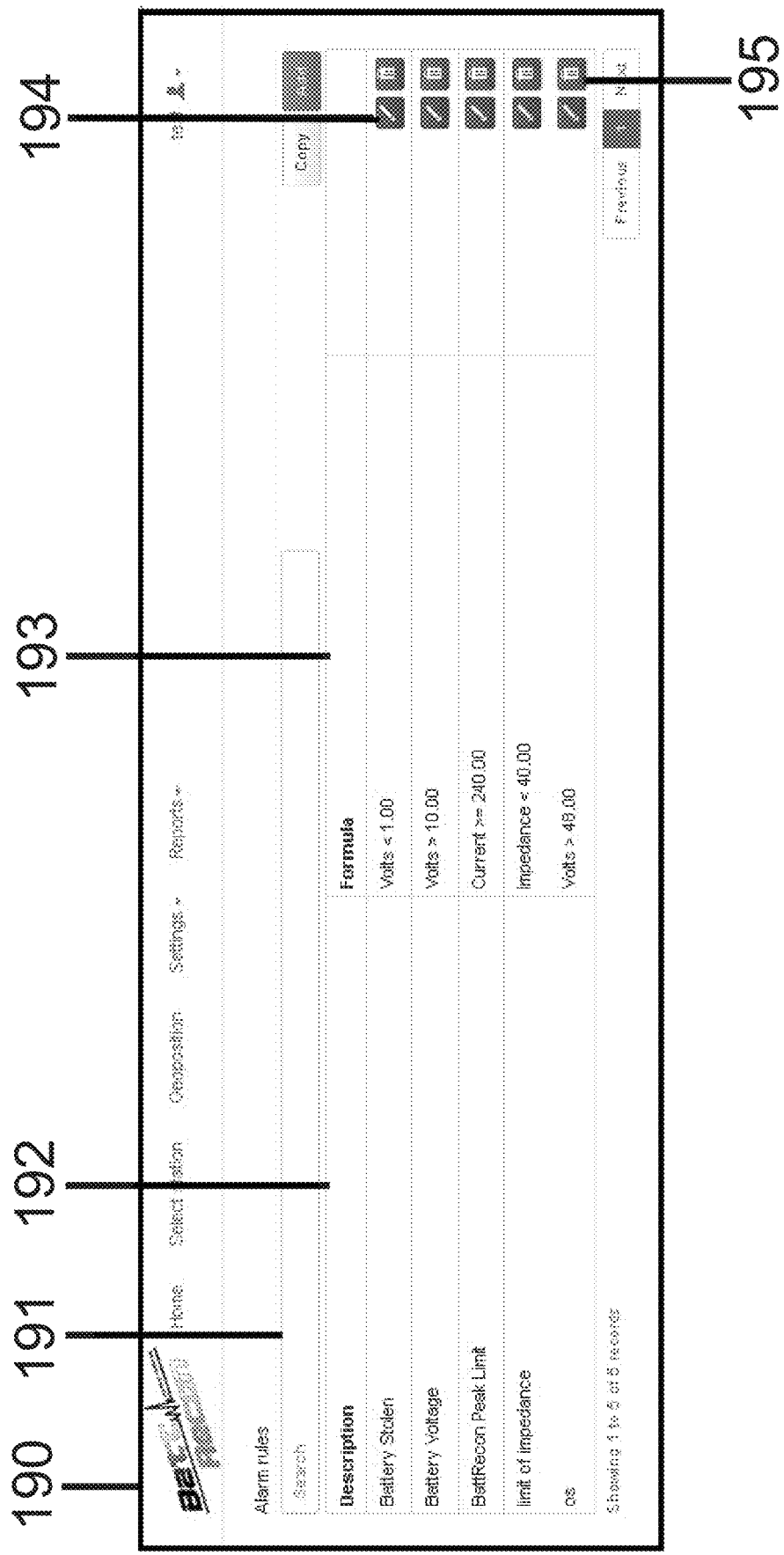
Figure 19:
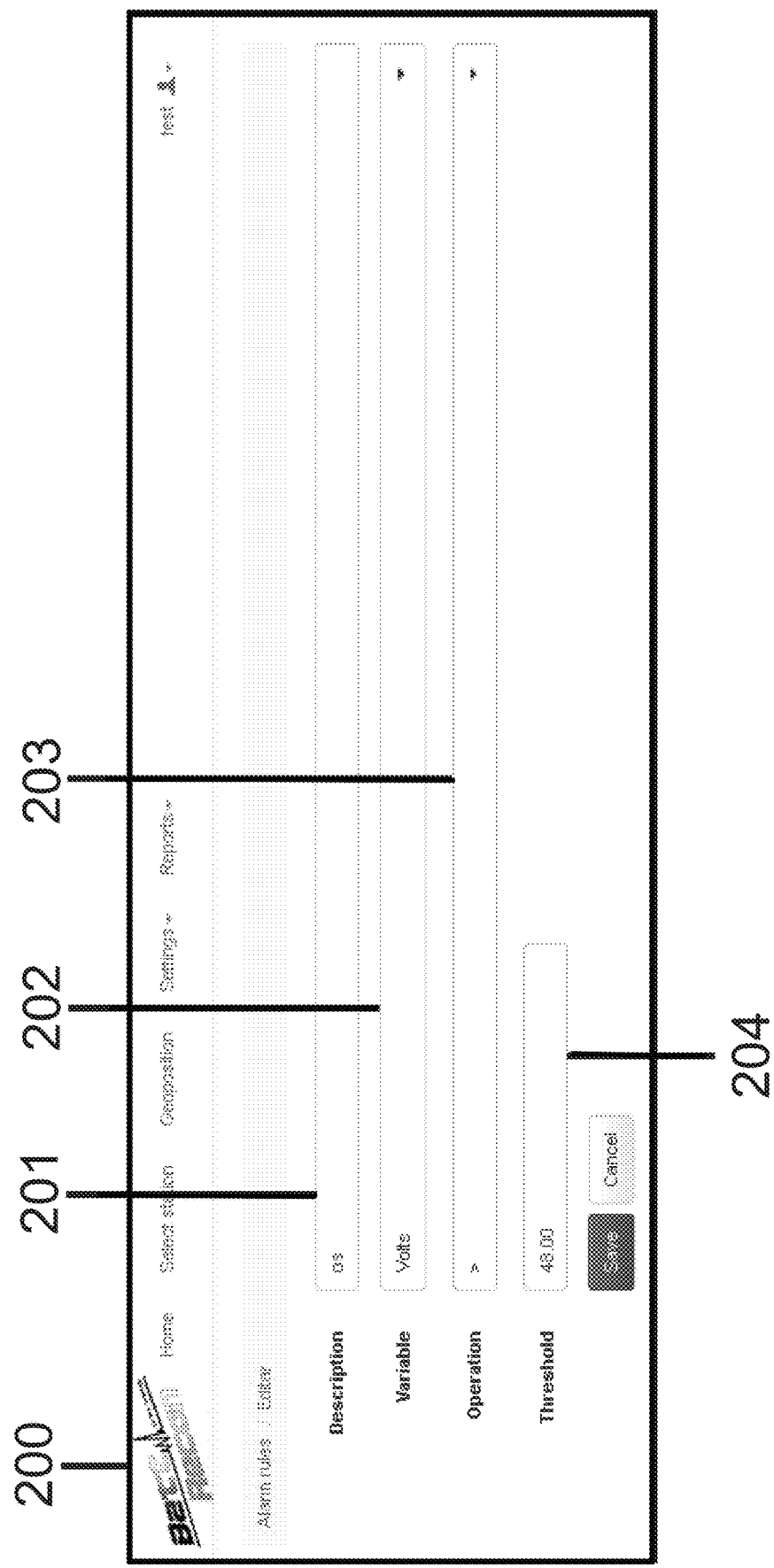
Figure 20:
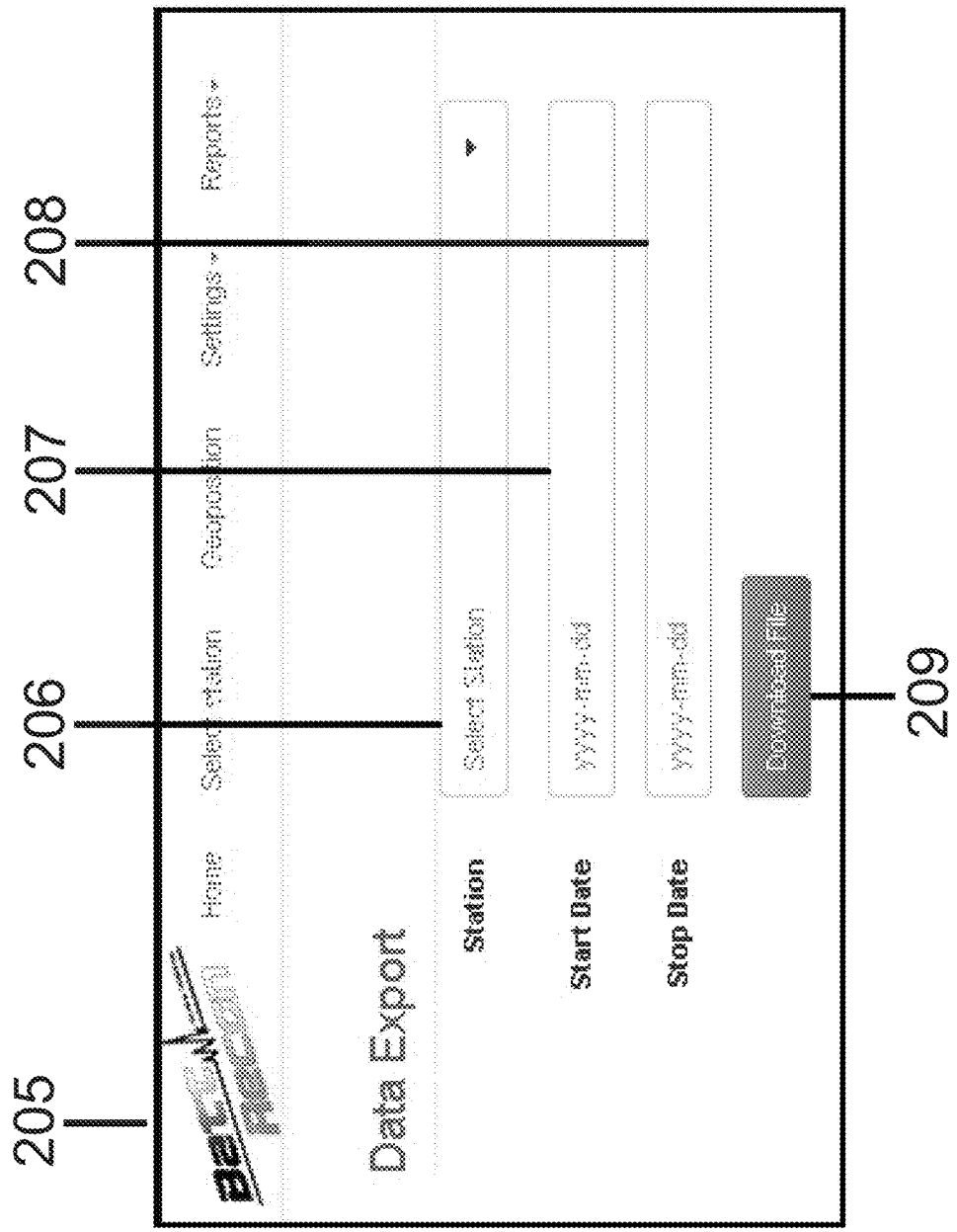
Figure 21:
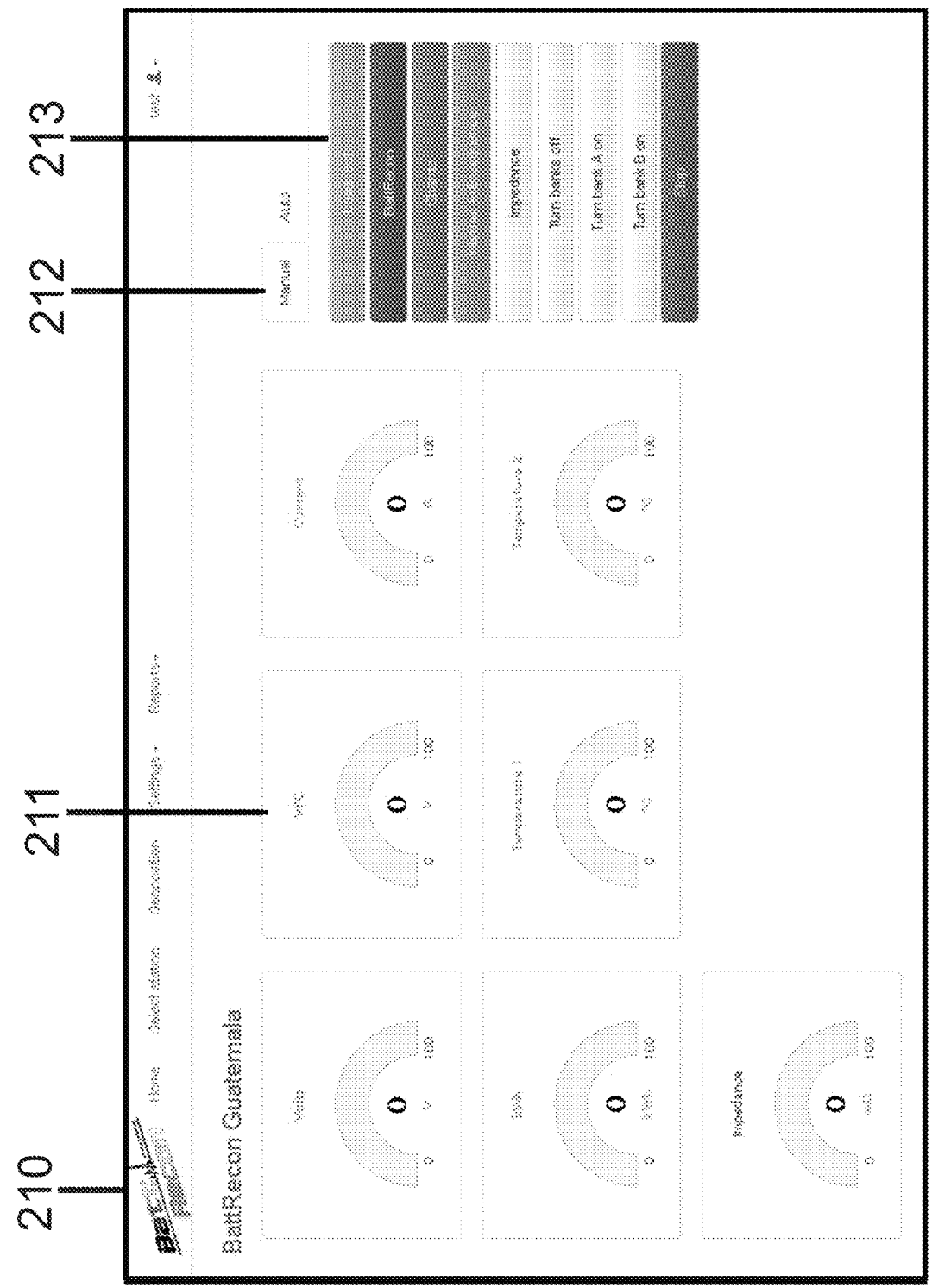
Figure 22:
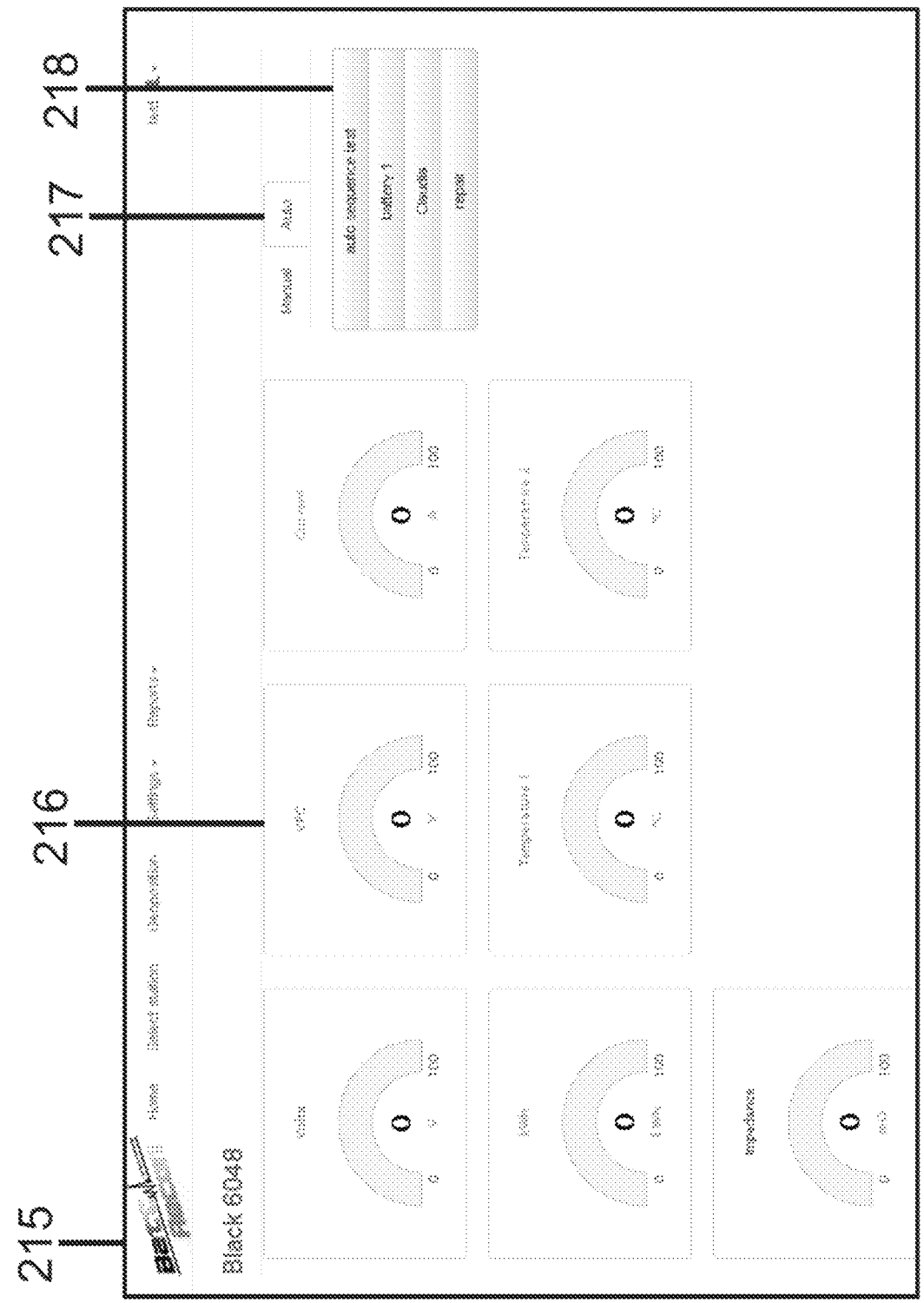
Figure 23:
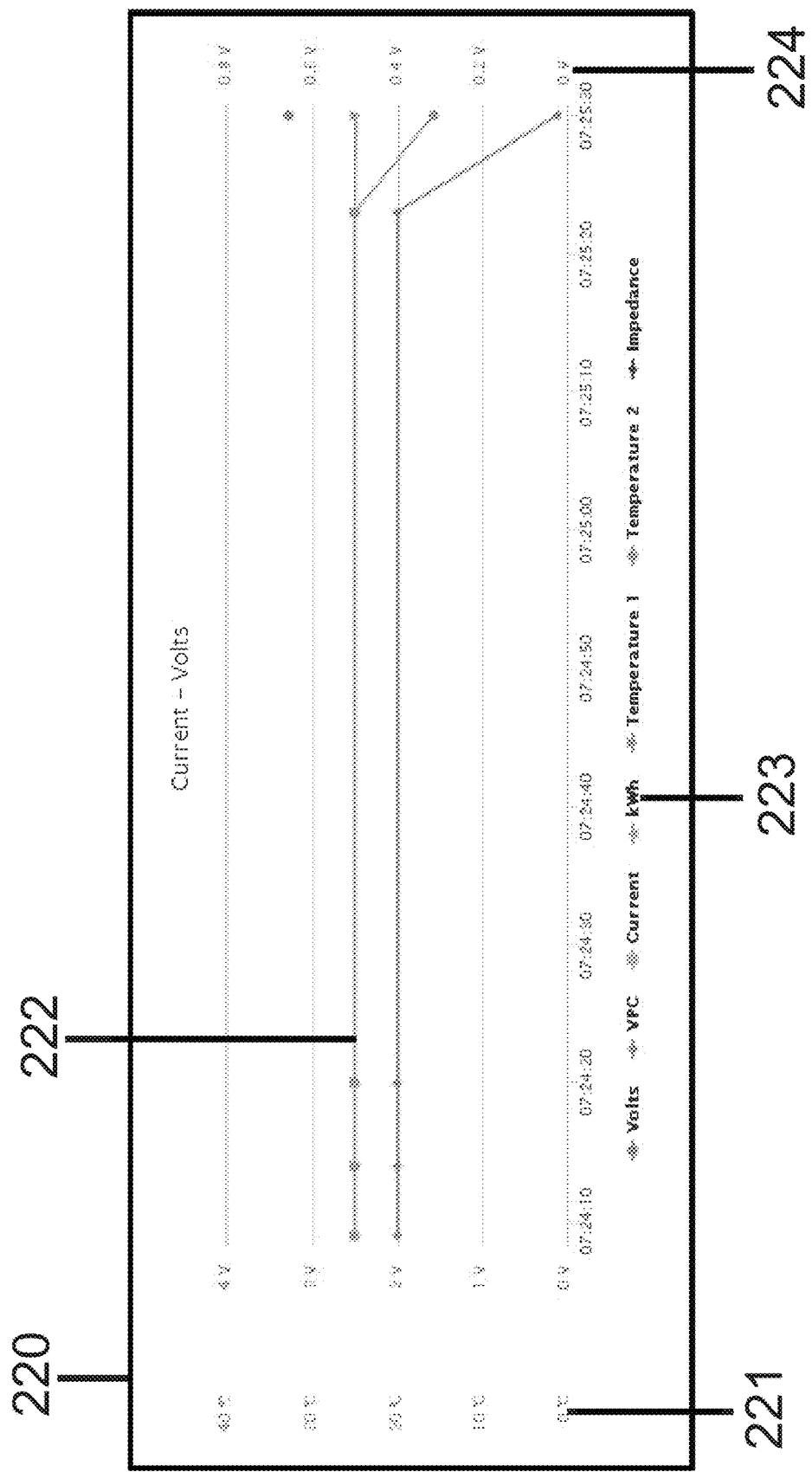

FIG. 1 is "The Cloud Based Systemic Block Diagram".
FIG. 2 is "The Cloud Capable Device Block Diagram".
FIG. 3 is "The Manual Mode Operational Block Diagram".
FIG. 4 is "The Auto Sequence Mode Operational Block Diagram".
FIG. 5 is "The Alarm Mode Operational Block Diagram".
FIG. 6 is "The Parameters Operational Block Diagram".
FIG. 7 is "The Environmental Condition Block Diagram".
FIG. 8 is "The Artificial Intelligence Logical Block Diagram".
FIG. 9 is "The Cloud Home Page".
FIG. 10 is "The Select Station View".
FIG. 11 is "The Geo-Position View".
FIG. 12 is "The Settings—Station Parameters View.
FIG. 13 is "The Settings—Station Parameters—Edit Parameters View".
FIG. 14 is "The Settings—Station Parameters—Assign Alarms View".
FIG. 15 is "The Settings—Station Parameters—Assign Auto Sequence View".
FIG. 16 is "The Settings—Auto Sequences View".
FIG. 17 is "The Settings—Auto Sequence—Edit Auto Sequence View".
FIG. 18 is "The Settings—Alarm Rules View".
FIG. 19 is "The Settings—Alarm Rules—Edit View".
FIG. 20 is "The Reports—Data Export View".
FIG. 21 is "The Dashboard—Manual Mode View".
FIG. 22 is "The Dashboard—Auto Sequence Mode View".
FIG. 23 is "The Graph View".

DETAILED DESCRIPTION OF THE INVENTION

This disclosure often refers to two categories of devices, 1) a controlling systemic means, device and process referred to as "The Cloud," and 2) the individually controlled "Functional, Service and/or Diagnostic Device(s), referred to as a "Cloud Capable Local Device."

The "Cloud Capable Device," reduces or eliminates technician labor, training and subjective error, by the manual or automatic logical connection, or disconnection, of a Service or Diagnostic Device(s) to a battery(s), a facility device, an environmental device or an ancillary device.

The "Cloud Capable Device" may then apply an analytically objective, pre-determined service or diagnostic process(s) between each desired service and diagnostic device(s), and the battery or facility by using a "single point" or multiple point connection means. The "Service or Diagnostic Device-to-Battery" applied process(s) may be locally or remotely, regionally or globally commanded and controlled using a wired or wireless means. Equivalent service or diagnostic devices may be applied to a facility device, an environmental device or an ancillary device.

Service or Diagnostic Devices may be individually or sequentially connected to a battery(s), the sequential position of the device(s) may be fixed, or variable in real time, with respect to their order of connection to the battery, the definition of the applied process(s) parameters, the duration of the applied process(s), or the repetition interval of the process(s). Equivalent service or diagnostic devices may be applied to a facility device, an environmental device or an ancillary device.

Once individual or cycle processes are completed, the "Cloud Capable System" may compare the resultant data metrics to an operator established metric parameter(s), or to a regional or a global database parameter(s), to determine a Battery Serviceability Means Tested Qualitative Value. The Qualitative Value may then be used to predict battery life remaining, battery performance ratios, or other qualitative analysis. Equivalent comparative means may be applied to a facility device, an environmental device or an ancillary device.

Service and diagnostic processes may be manually or automatically, locally or remotely scheduled or unscheduled.

Service and Diagnostic devices and their respective applied process(s), may be individually or repetitively applied to a battery(s), a facility, an environment, or ancillary devices, in a fixed or random sequence.

The "Cloud Capable Device(s)" may "Auto Sequence" the devices, which provide a changing physical and electrically conductive interconnection between the Service and Diagnostic Device(s), and the battery(s), the facility devices, an environmental device, or an ancillary device, when more than one Service or Diagnostic Device is used.

The "Cloud Capable Device(s)" may "Auto Start" the device(s), which provide a changing physical and electrically conductive interconnection between the Service and Diagnostic Device(s), and the battery(s), once a battery(s) is detected that it has been connected to the Service or Diagnostic Device. Equivalent service or diagnostic devices may be applied to a facility device, an environmental device or an ancillary device.

The Cloud Capable Device may control a Service or Diagnostic Device by factors other than battery metrics, such as ambient temperature, AC Mains voltage and current characteristic, time, humidity, etc.

The remote placement, Command and Control of the "Cloud Capable Device(s)" reduces or eliminates transportation expenses when compared to the "Conventional Service" methodology.

The "Cloud Capable Device" consists of: 1) a computer based hardware/software means incorporated within a "Master Control Board" (MCB) with an integral computer processor and imbedded software, 2) an internal or external power switching means, 3) a power interconnection means providing a physical and electrically conductive pathway between the battery(s) and the individual service device(s), 4) sensor and transducer inputs with associated physical and electrically conductive pathways to collect device and battery metrics for the MCB, 5) various output means to provide a physical and electrically conductive pathway from the MCB to the Service or Diagnostic Devices, transducers, actuators, or other output control means, 6) a bi-directional wired or wireless communication means, and 7) a data storage means such as a computer server.

A "Single Point Means" refers to the existence of one battery, or facility device, connecting point (connector) on the "Cloud Capable Device's" chassis, where the battery(s) or facilities devices are physically and electrically mated with the power interconnecting means (wiring or electrical buss) within the "Cloud Capable Device. The battery(s) facilities devices are subsequently physically and electrically mated with the Service and Diagnostic Device(s), within the "Cloud Capable Device(s), as controlled by the "Cloud Based Service Instructions issued by the "Cloud Operator".

The battery, facility device, environmental device or ancillary devices are temporarily connected to the "Cloud Capable Device's" chassis using one connection, while the Internal/External Devices are "permanently" connected to the "Cloud Capable Device." The Service and Diagnostic Device(s) are then sequentially connected to the battery, facility device, environmental device, or other ancillary device, through the "Cloud Capable Device," according to the Command and Control Instructions issued by the "Cloud Based Operator." The "Cloud Capable Device's" MCB control board, processor, software and stored commands then control the connection(s) between the battery(s) and the service device(s).

The "Cloud Capable Device(s)" initial installation and configuration requires that the individual service or testing device(s) and associated service sub-devices, sensors or transducers; be permanently connected to the "Cloud Capable Interface Hardware Device." The "Cloud Capable Device" would have corresponding connection means to accommodate individual external service devices, individual service sub-devices, sensors and transducers, and an individual battery(s).

Once the service device(s) are "permanently" connected to the to the "Cloud Capable Local Device," then the battery(s) or facilities devices may be connected using a single/multiple point connection means located on the "Cloud Capable Device," to charge, discharge, apply diagnostic processes, or perform other service or diagnostic functions, based upon a pre-programmed, or real time modified, analytical methodology.

Those Battery Service or Diagnostic Devices may include but not limited to: a charger(s), a power supply used in a dedicated device such as a charger or battery desulfation system, a load bank discharging system, a battery de-sulfation process device(s), a battery watering device, a battery specific gravity testing device, a battery washing device, or other devices that apply a service related process to a battery. The number of participating Service and Diagnostic Devices may be limited by the processor size and speed, and the physical space and size constraints of the local installation.

An exemplary "Cloud Capable Command and Control System:"

May control the operational topology of a Service or Diagnostic Device(s), either internally or externally, locally or remotely, using a wired or wireless means to bi-directionally transmit commands to and from a computer processor using software instructions and algorithms.

May bi-directionally transmit the Service or Diagnostic Device's data metrics, or the data metrics of sub-devices, sensors or transducers, either internally or externally, locally or remotely, using a wired or wireless means to bi-directionally transmit commands to and from a computer processor using software instructions and algorithms, then stored on a data storage means such as a computer server.

May bi-directionally measure and control the transmitted data metrics from the Service or Diagnostic Device's internal or external sensors or transducers.

May bi-directionally communicate using GSP telemetry and Internet capable communication from a fixed IP address.

May use a computer server means to store and retrieve the transmitted data metrics from the Service or Diagnostic Device's internal or external sensors or transducers.

May collect raw data for use by a computer processor and software algorithms, to create operational commands intended to control a device(s), or any sub-devices, or any of the device(s) internal or external sensors or transducers.

May collect raw data for use by a computer processor and software algorithms, to create operational commands.

While the data formats, algorithms and bi-directional communications means may vary depending on the available external communication devices; the use of battery, battery cell or non-battery device operational metrics in a bi-directional communication means may remain the same or similar amongst differing devices.

The Cloud Based System may process this data to compare the desired device's operational metrics, to the device's actual measured operational metrics, using a specially developed Command and Control Algorithm disclosed herein.

FIG. 1: The Cloud Based Systemic System 1 is a software program hosted on a computer server that provides for the Graphical User Interface (GUI), the communications software programming, the database programming and storage means, and the Scan, Command and Control means to bi-directionally communicate 2 with Cloud Capable Local Devices 3 using Communications Module 4. When commanded, local device 3 controls Interconnection means 5, that provides the electrical and physical connection means between a Battery 11 and Battery Metrics 12, a Facility 7 and Facility Metrics 8, an Environment 9 and Environmental Metrics 10, or an Ancillary Device 13 and Ancillary Metrics 14; and Internal Devices 6 and External Devices 15.

FIG. 2: Illustrates the logical relationships within the Cloud Capable Local Device 20, which includes a Communications Module 21, a Computer Processor 22, an Interconnection Means 23, Internal Device 24, a Master Control Board 25, a high current Power Board 26, and an input-output device "Cut Out" board 27. The different modules interact to provide a Scan, Command and Control means either as a standalone local device, or as a Cloud Based Interactive Device.

FIG. 3: Illustrates the Manual Mode Operational process 30, consisting of various Manual Mode Devices and their associated control means, such as operational and safety parameters, a timing factor and other operator specific limitations. Examples of exemplary Manual modes may be: A Charging Process 31, a BattRecon Branded De-sulfation Process 32, a Load Discharge Test 33, an Internal Auto Sequence process 34, an Impedance Testing Process 35, an All Banks Off Process 36, a Bank A On Process 37, a Bank B On Process 38, an Other Devices Process for the development user defined devices 39, and Other Functions for the development of user defined functions 40. Once the Cloud Based Manual Mode Function is chosen to be applied, then the Bi-Directional Communications Module 41 facilitates the communication between the Cloud Based System and the Cloud Capable Local Device 42. The Manual Mode Function may be performed solely using the Cloud Capable Local Device, absent of the Cloud Based System.

FIG. 4: The Auto Sequence Mode Operational diagram illustrates how the Cloud Based System 45, sequentially positions Manual Mode functions, by either an operator, or an Artificial Intelligence Module, selecting Manual Mode Functions 46 and "placing" them in a preferred order within the Auto Sequence Module 52. Once selected, those functions are then bi-directional communicated by module 58, onwards to the Cloud Capable Local Device 59. Exemplary Cloud Based Systems include, but are not limited to, Manual Mode Functions such as; Charge 47, BattRecon 48, Load Test 49, Internal Auto Sequence 50, and Impedance testing 51. An example of an Auto Sequence 52 is illustrated as first positioning the Manual Mode Charge function 53, followed by the Manual Mode Load Test Function 54, followed by a repetition of the Manual Mode Charge Function 55, followed by the Manual Mode BattRecon function 56, and followed by a repetition of the Manual Mode Load Test function 57.

FIG. 5: Illustrates the basic operational block of the Alarm Mode Function 65, consisting of Alarm Definitions, Commands and Control Processes 66, which in the event of a fault and corresponding Alarm Condition, bi-directionally communicates the Alarm via the Bi-Directional Communications Means 71, in a bi-directional manner to the Cloud Capable Local Device 72. An exemplary Alarm definition may be a Battery Stolen Alarm 67, which is defined as a condition wherein the measured battery voltage is less than 1 volt. Another Alarm condition example would be the Battery Amps alarm 68, which is defined as a condition wherein the amperage is greater than 125 amps. An example of the Facilities Alarm condition is the Door Open Alarm 69 condition wherein a door switch is activated that triggers the alarm fault. Another Facilities example may be the Fuel Tank Quantity Alarm 70, which is a condition defined as when the fuel level drops below 40 gallons.

FIG. 6: Illustrates basic Parameters Operational block allows the operator to define parameters utilized by the Cloud Based Systemic System 75 and Local Device Manual Mode or Auto Sequence Mode Parameters 76 development. An exemplary example of a Manual Mode parameters may be The External Charger 77 parameter definition, wherein the charger will be disconnected from the battery whenever the Amps exceeds 125 amps, or the volts per cell (VPC) exceeds 2.55 volts. Another exemplary Manual Mode parameter example may be the BattRecon 78 parameter definition, wherein the BattRecon module will be disconnected from the battery whenever the Peak Amps exceeds 225 amps, or the VPC exceeds 3.0 volts. A final exemplary example of a Manual Mode parameters may be The Facility Air Conditioning 79 parameter definition, wherein the facility air conditioning system will cycle between a low of 68 degrees and a high temperature value of 72 degrees Fahrenheit. The Local Device Parameters 76 may be Bi-directionally Communicated 8) between The Cloud Capable Local Device 81 and The Cloud Based Systemic System 75.

FIG. 7: Illustrates the Environmental Condition Block module within the Cloud Based Systemic System 85, that allows the operator to define the Environmental Conditions 86 that are then bi-directionally communicated 90 between the Cloud Based Systemic System 85 and the Cloud Capable Local Device 91. An exemplary example of a Manual Mode Environmental definition may be the Outside Air Temperature Definition 87, defined to be a temperature ranging between 68 and 72 degrees Fahrenheit, controlled by the Heating Control Device. Another exemplary Manual Mode Environmental Condition may be the Humidity 88 condition definition, wherein the humidity is defined to be between 35% and 45%, controlled by the Humidity Control Device. A final exemplary example of an Environmental Condition may be The Freezer 89 condition, wherein the freezer temperature is monitored between 30 and 34 degrees Fahrenheit, any variance above or below these parameters would activate the Temperature Alarm Device.

FIG. 8: Illustrates the logical elements of the Artificial Intelligence Module, which are combined in real time to facilitate non-human processing, metric importation and processing, problem solving and the implementation of those problem solving resolution. Exemplary Artificial Intelligence may include but is not limited to: the Human Language and Voice Interface 95, The Real Time Measurement of Metrics 96, Comparing Historical Metrics to Real Time Metrics 97, the Real Time Scanning of Local Devices 98, the Real Time Modification of Metric Parameters 99, the Real Time Device Control development and Implementation 100, the Real Time Device Command development 101 the Real Time Data Processing, Storage and Retrieval 102, and the Real Time Alarm Parameter Development and Implementation 103.

FIG. 9: Illustrates an exemplary Cloud Based Operational Homepage 105 page of the BattRecon Cloud Based Graphical User Interface (GUI), which has category functions tabs as follows; the Select Station Functional Tab 106, the Geo-position Functional Tab 107, the Settings functional Tab 108, the Reports Functional Tab 109 and the Test/User Functional tab 110. Using a computer pointing device and a computer display, the operator may "click: on the tab to open the category menu drop down window FIG. 10: Illustrates an exemplary Select Station Page 115 page of the BattRecon Cloud Based GUI, consisting of a Station Identification column 116, an Alarm Enabled column 117, and a Dashboard Selection Column 118. Using a computer pointing device and a computer display, the operator may "click" on the Dashboard Selection Column 118 they choose to select, opening the identified station Identification column 116 for operational use. The selected Station dashboard has an indicated Alarm setting, a Red graphical icon shows that at least one alarm is operable for that particular station, while a green icon indicates the absence of any defined Station Alarms have been set for that respective Station.

FIG. 11: Illustrates the Geo-Position View 120 page of the BatRecon Cloud Based GUI, which geographically locates and displays Cloud Capable Local Device graphical icons. Those icons may use a color indication to show the status of the local device, Red Indications 122 may indicate a failure fault, and a Green Indication 121 may be indicative of a local device operating in a normal condition without faults. The operator may "click" on the colored indication, which expands a drop down window with station status information. If the operator chooses to operate the station manually, they click on the Drop Down Status Window and are directed to that Station's Dashboard.

Figure 12:
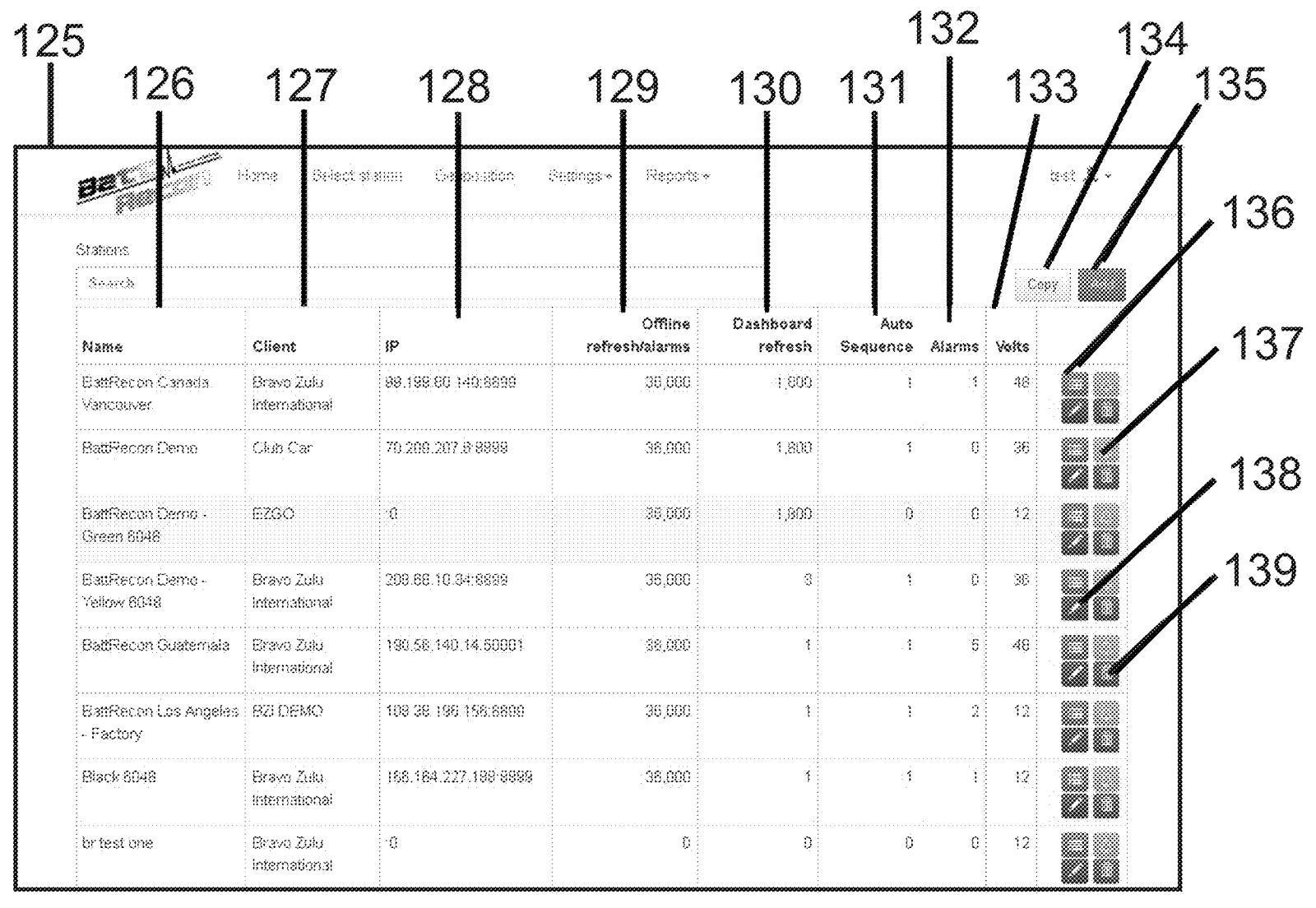

FIG. 12: Illustrates the Settings—Station Parameters—Assign Alarms View 125 page of the BattRecon Cloud Based GUI, which indicates specific Station Parameters Information. The Station Name 126 describes unique station Identification description, the Client 127 identifies the owner of the station, the Station IP address 128 is the internet identifier of the station, the Offline Refresh/Alarms 129 category displays the time interval in seconds that the system repeatedly performs an interrogation of the Cloud Capable Local Device to "keep the device alive," and ascertain the station's readiness to receive a command, the Dashboard Refresh 130 column indicates the rate in seconds (frequency) that the Dashboard Display information is updated from the Cloud Capable Local Device, the Auto Sequence Column 131 indicates the number of Auto Sequence Functions have been assigned to this station, the Alarms column 132 indicates the number of alarms which may have been assigned to this station, the Volts column 133 indicates the Global Voltage Setting of the Cloud Capable Local Device, the Copy button 134 allows faster setup of station by copying the information, and the Add button 135 allows the operator to add stations to the list. Each station has four colored functional buttons, the Green Auto Sequence Button 136 which when clicked opens that station's Assign Auto Sequence Window, the Orange Alarms Button 137 which when clicked opens the Assign Alarms Window, the Blue Edit Station Button 138 opens the Edit Station window, and the Red Delete Button 139 delete the station from the list.

FIG. 13: Illustrates the Settings—Station Parameters—Edit Parameters View 145 which describes the following categories: The Client Name 146, the Station Name 147, the Local Device Location Latitude 148, the Local Device IP Address 149, the Offline Refresh/Alarms 150 rate in seconds, the Nominal Global Voltage Setting 151, the default BattRecon Time Duration 152, the Local Device Location Longitude 153, the Computer Access Port Setting 154, the Dashboard Screen Refresh Rate 155) in seconds, the Default BattRecon Target Current Setting 156 in Peak Amps, the Default Charge Maximum Time 157 in hours, minutes and seconds, the Default Load Test Maximum Time 158 in hours, minutes and seconds, the Default Maximum Charge Current 160 allowed to By-Pass or "pass through" the Local Device, and the Default Load test nominal discharge target current 161.

FIG. 14: Illustrates the Settings—Station Parameters—Assign Alarms View 162, which shows the selection of the Battery Stolen 163 alarm condition to be in the "ON STATE," thus placed on the respective Operational Dashboard, and the remaining alarm capabilities exemplified by Battery Voltage 164 in the "Off State," not placed on the respective Operational Dashboard.

FIG. 15: Illustrates the Settings—Station Parameters—Assign Auto Sequence View 165, which lists the actively selected auto sequences for use with the referenced Operational Dashboard. In this exemplary example, the Auto Sequence (18-125-13) 166 is not activated, nor are any other Auto Sequence Modes activated.

FIG. 16: Illustrates the Setting—Auto Sequence View 170 window, which provides for a Search Capability 171 of listed auto sequences, identifies the NAME of the selected Auto Sequence 172, the name of the Client 173, the number of Assigned Auto Sequences 174 the ability to EDIT (add or subtract auto assigned auto sequences) 175 and the ability to Delete 176 the entire Auto Sequence Assignment.

FIG. 17: Illustrates the Settings—Auto Sequence—Edit Auto Sequence View 180 which allows the operator to add or delete individual Sequences (Manual Mode Operational Processes) 181, to alter the Parameters of each Sequence 182/183, determine the maximum time duration of the Sequence 184, a Time Adjustment Means 185 and the means to Delete a Manual Mode Operation 186.

FIG. 18: Illustrates the Settings—Alarm Rules View window 190 that allows the operator to Search the Alarms Database 191, Identify Alarms by description 192, view the Alarms Parameter Threshold Formula 193, Edit Alarms 194 by clicking on the Blue Edit Icon, and Delete 195 Alarms by clicking on the Red Delete Icon.

FIG. 19: Illustrates the Settings—Alarm Rules—Edit Alarm View 200 which provides a Description 201 of the Alarm Condition, the Variable 202 or the relevant Metric of the Alarm Condition, the Mathematical Operator 203 of the Alarm, and the Operational Metric Threshold of the Alarm 204.

FIG. 20: Illustrates the Reports—Data Export View 205 which provides for the saving of the operational data into an exportable computer file that may be stored and later retrieved, printed, or tabulated into reports, charts and graphs. The Data Export File is selected from a Station 206, and requires the establishment of a Start Date 207 and a Stop Date 208, which allows the Cloud Based System to identify the desired data range for export, then collate the data and Download a File 209 from the Cloud Based System to an operator selected computer storage and operation means.

FIG. 21: Illustrates an exemplary Station Dashboard in a Manual Mode View 210 with the Metric Indication Gauges 211, the Manual Mode Tab 212 and the Manual Mode Selection Table 213. The Gauges 211 which provide a visual display of the battery or device metrics, will vary depending upon the type of process monitored. A battery for example, may have a Volts Gauge, while a Facility may have a Room Temperature Gauge.

FIG. 22: Illustrates the Dashboard Auto Sequence Mode 215, with the Metric Indication Gauges 216, the Auto Sequence Mode Tab 217 and the Auto Sequence Profile Selection List 218.

FIG. 23: Illustrates the Graph View of the Dashboard 220, which displays one or more real time Line Graph Displays 222, that display Metric Data 223 derived from the Cloud Capable Local Device. Scaling Ranges 221/224 indicate the metric Parameter Ranges of the graph displayed metrics, which vary depending upon the selected displayed metrics.

Thus, specific embodiments of a "Cloud Capable" Battery Device Command and Control Management System with an Artificial Intelligence Means have been disclosed. It should be apparent, however, to those skilled in the art that many more modifications besides those described are possible without departing from the inventive concepts herein. The inventive subject matter, therefore, is not to be restricted except in the spirit of the appended claims.

The invention claimed is:

1. A cloud based systemic system comprising:
   a computer system having hardware, firmware, data storage and software with at least one Cloud Capable Local Device;
   said computer system having a bi-directional communication that is configured for local or remote connection, or monitoring, or control of said at least one Cloud Capable Local Device;
   said Cloud Capable Local Device is connected to at least one battery;
   when said at least one battery is connected to said Cloud Capable Local Device said Cloud Capable Local Device performs a Geo-position of the battery and performs an electrical test where results of said electrical test are compared to a database of known battery definitions to determine a deviation;
   said deviation is used to formulate alarm parameters and triggers, activate an alarm condition, formulate and implement a corrective action, test the corrective action, store the event data and reset the Alarm Condition, all without specific human intervention as related to said at least one battery that is remotely viewable;
   said Cloud Capable Local Device has an internal auto sequence mode that charges said at least one battery, a BattRecon de-sulfation process and then a discharge test to said at least one battery;
   said Cloud Capable Local Device has a Manual Mode operation that applies one process to one said Cloud Capable Local Device to battery(s), facility(s), or an environmental condition to said at least one battery;
   an auto sequence array that sequences through at least two Manual Mode operations;
   said at least one Cloud Capable Local Device includes said Manual Mode operation, said internal Auto Sequence mode, a safety and operational function, a create operational Alarm profiles function, a remote scanning process to measure and transmit measurement of a said at least one battery, facility, an environmental or ancillary device metrics, a remote Command Process that enables an operator to create and implement functional device commands, a function to provide a real time display, a function to change parameters for the Manual Mode operation during assignment and positioning within the Auto Sequence Array, a manual mode function that cycles between multiple said Manual Mode operations within the Auto Sequence Array that uses a time limitation, wherein when the time limitation expires, an Auto Sequence routine moves to a next sequential Manual Mode operation, a function that cycles between the Manual Mode operations within the Auto Sequence Array that uses a Volts per Cell (VPC) limitation, wherein when an Assigned VPC is attained or exceeded, the Auto Sequence routine moves to the next Manual Mode operation within said auto sequence array, and
   a process to cycle between Manual Mode operations within the Auto Sequence mode by using a metric parameter limitation, when the assigned metric parameter, or parameters range is attained or exceeded, the Auto Sequence array moves to the next sequential Manual Mode operation.

2. The cloud based systemic system according to claim 1, that further includes applying physical connection or an environmental condition to said at least one battery, a facility, or an auxiliary device.

3. The cloud based systemic system according to claim 2, that further includes an auto start, an auto stop, an auto event detection, a remote re-boot, an auto voltage detection, an auto device detection, and an auto switching mode.

4. The cloud based systemic system according to claim 3, that further includes communication to at least two Cloud Capable Local Devices.

5. The cloud based systemic system according to claim 4, that further includes an active device polling of said at least two Cloud Capable Local Devices.

6. The cloud based systemic system according to claim 5, that further includes a Geo-Reference positing system that locates said at least one Cloud Capable Local Device onto a map, with a status indicator.

7. The cloud based systemic system according to claim 6, that further includes status reporting by text, email or cell call.

8. The cloud based systemic system according to claim 7, that further includes a fault generation and fault reporting.

9. The cloud based systemic system according to claim 8, wherein in the fault generation creates a fault reporting for an automated corrective action that is stored within the computer system or the Cloud Capable Local Device.

10. The cloud based systemic system according to claim 9, wherein the fault generation is based upon measured said at least one battery, facility, environmental conditions, or a device metric.

11. The cloud based systemic system according to claim 10, that further includes at least one custom alarm, at least one custom parameter, a centralized command and control center, at least one remote viewer or operator, a simulation mode and a playback mode.

12. The cloud based systemic system according to claim 11, that further includes unique parameters for identical applied devices and for differing sequential steps within the auto sequence mode.

13. The cloud based systemic system according to claim 6, wherein said at least one Cloud Capable Local Device controls a facility or an environmental condition.

14. The cloud based systemic system according to claim 6, wherein the electrical test is at least one of a charging process, a De-sulfation process, a load discharge test, an internal auto sequence, an impedance testing, an all banks off process, a bank A on process, a bank B on process, a user defined test or process.

15. The cloud based systemic system according to claim 6, further includes a Graphical User Interface (GUI) for management of said at least one Cloud Capable Local device.

16. The cloud based systemic system according to claim 15, wherein said Graphical User Interface has a home page, a station select page, a Geo-Position Reference page, a Station Parameters view page, an Edit Station Parameters page, an Assign Auto Sequence Modes Page, an Edit Auto Sequences page, an Assign Stations Alarms Page, an Alarm view page, an Edit Alarms rules page, a Reports Data Export page, an operational Dashboard Manual Mode page, an operational Dashboard Auto Sequence page, a functional Graph view page and a discrete password and username page.

* * * * *